United States Patent [19]

Yahagi et al.

[11] Patent Number: 4,677,203

[45] Date of Patent: Jun. 30, 1987

[54] CHROMOGENIC FLUORAN DERIVATIVES

[75] Inventors: Masakichi Yahagi, Tokyo; Shoichi Horiuchi, Fujimi; Takahumi Toyama, Tokyo; Akio Kashiwagi, Ageo; Teruo Suzuki, Tokyo; Tetsuo Igaki, Kawagoe; Kazuyuki Horisawa; Mituhiro Shoji, both of Tokyo, all of Japan

[73] Assignee: Shin Nisso Kako Co., Ltd., Japan

[21] Appl. No.: 504,272

[22] Filed: Jun. 14, 1983

Related U.S. Application Data

[62] Division of Ser. No. 654,732, Feb. 3, 1976, Pat. No. 4,410,708, which is a division of Ser. No. 472,204, May 21, 1974, Pat. No. 3,959,571.

[30] Foreign Application Priority Data

| May 22, 1973 | [JP] | Japan | 48-56278 |
| Aug. 22, 1973 | [JP] | Japan | 48-93260 |
| Mar. 8, 1974 | [JP] | Japan | 49-26876 |

[51] Int. Cl.$^4$ .............................. C07D 493/10
[52] U.S. Cl. ............................... 546/15; 544/70
[58] Field of Search .......................... 546/15; 544/70

[56] References Cited

U.S. PATENT DOCUMENTS

| 3,627,787 | 12/1971 | Lin | 546/15 x |
| 3,649,649 | 3/1972 | Orita et al. | 546/15 X |
| 3,901,918 | 8/1975 | Koga et al. | 544/70 X |

*Primary Examiner*—Richard A. Schwartz
*Attorney, Agent, or Firm*—Abelman, Frayne, Rezac & Schwab

[57] ABSTRACT

Certain 3-piperidino fluoran derivatives useful as color recording materials are disclosed.

15 Claims, No Drawings

CHROMOGENIC FLUORAN DERIVATIVES

This application is a division of U.S. patent application Ser. No. 654,732, filed Feb. 3, 1976, now U.S. Pat. No. 4,410,708, which is a division of U.S. patent application Ser. No. 472,204, filed May 21, 1974, now U.S. Pat. No. 3,959,571, granted May 25, 1976.

This invention relates to new chromogenic fluoran derivatives represented by the general formula,

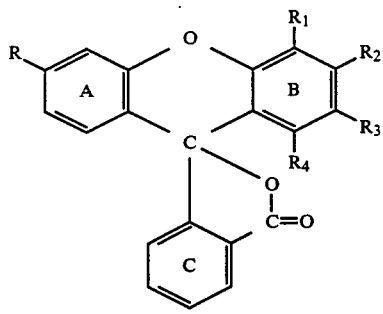

wherein R is a piperidino group, a pyrrolidino group, a morpholino group, a methylpiperidino group, an N-lower alkyl-cyclohexylamino group or an N-benzyl-cyclohexylamino group; $R_1$ is a hydrogen atom, a lower alkyl group, a substituted or unsubstituted amino group or a halogen atom; $R_2$ is a hydrogen atom, a lower alkyl group, a lower alkoxy group or a halogen atom; $R_3$ is a hydrogen atom, a $C_{1-8}$ alkyl group, a phenyl group, a piperidino group, a methylpiperidino group, a pyrrolidino group, a moropholino group, a group of the formula

(where X represents a hydrogen atom, an acyl group, a lower alkyl group, a benzyl group, a cyclohexyl group or a substituted or unsubstituted aryl group; and Y represents a hydrogen atom, an alkyl group or a substituted or unsubstituted benzyl group), a halogen atom, an alkoxy group or a substituted or unsubstituted diphenylmethylamino group; and $R_4$ is a hydrogen atom, a lower alkyl group or an alkoxy group, provided that $R_1$ and $R_2$, and $R_3$ and $R_4$ may be groups represented by the formula —CH=CH—CH=CH—, and, in this case, the naphthalene ring may have a halogen atom or a substituted or unsubstituted amino group, and the benzene ring C may have 1 to 4 halogen atoms. Further this invention relates to a method of recording by development of color where at least one of said fluoran derivatives is brought into intimate contact with an electron-accepting material, thereby permitting said fluoran derivative to develop a color.

Fluoran derivatives represented by the above-mentioned general formula (I) are substances which are substantially colorless in themselves, but have such property that they quickly develop deep colors when brought into intimate contact with such electron accepting materials as, for example, acids, clays, phenol-formalin resins or bisphenol A.

Accordingly, a color is developed when an inert organic solvent solution of the fluoran derivative represented by the general formula (I) is contacted with a clay or phenol-formalin resin. Alternatively, a color is developed when a mixture comprising the fluoran derivative and a clay, phenol-formalin resin or bisphenol A is heated to a temperature above the melting point of at least one of the two components, thereby intimately contacting the two with each other.

Since the fluoran derivatives of the general formula (I) have such property as mentioned above, they may be used as chromogenic materials for, for example, pressure-sensitive copying papers, pressure-sensitive recording papers, heat-sensitive recording papers and heat-sensitive copying papers. Further, the fluoran derivatives, when brought into the form of colorless inks by dissolving them in castor oil or the like vegetable oils, can be printed on surfaces coated with electron-accepting materials, and thus may also be used as chromogenic materials in methods of recording by development of color.

As substances similar in structure to the fluoran derivatives of the general formula (I) which have heretofore been used as chromogenic materials for pressure-sensitive copying papers or heat-sensitive papers capable of developing deep colors on contact with such electron-accepting materials as clays or resins, there have been known, for example, the following fluoran derivatives:

3-Diethylamino-6-methyl-7-anilinofluoran (A)

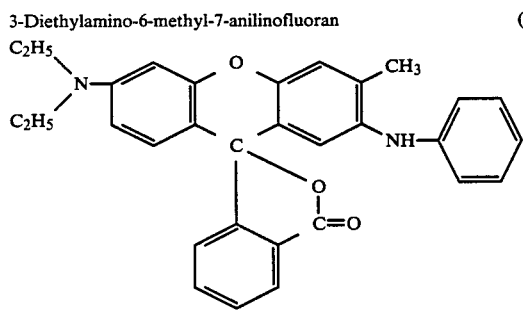

(Refer to Belgian Patent 744,705)

3-Diethylamino-7-benzylaminofluoran (B)

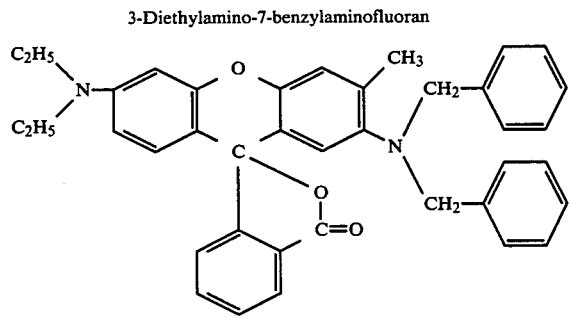

(Refer to Japanese Patent Publication No. 12,312/1971)

3-Diethylamino-6-methyl-7-chlorofluoran (C)

3-Diethylamino-7-piperidinofluoran (D)

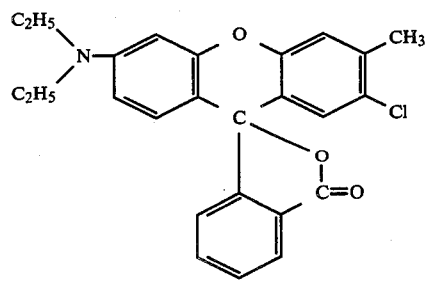
(Refer to Japanese Patent Publication No. 21,199/1968)
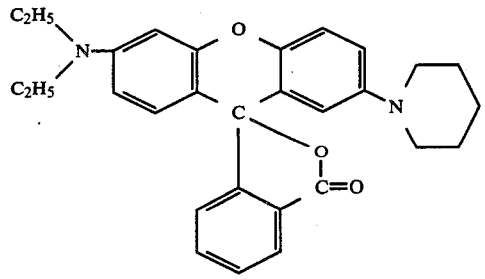
(Refer to Japanese Patent Publication No. 42,007/1972)
3-Diethylamino-7-morpholinofluoran  (E)
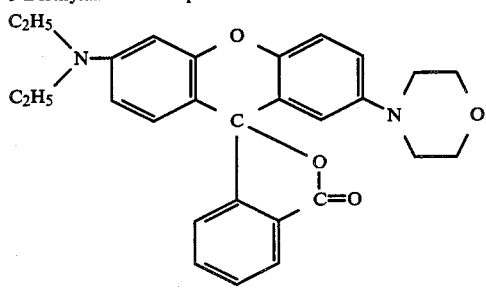
(Refer to Japanese Patent Publication No. 46,217/1972)
On the other hand, the fluoran derivatives of the general formula (I) are, for example, as follows:
(F)
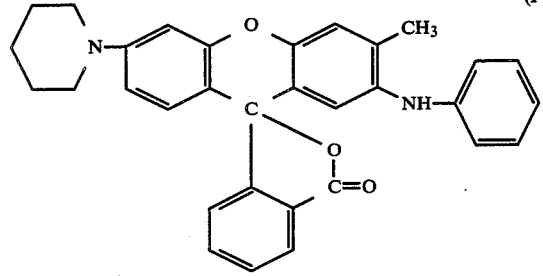
(G)
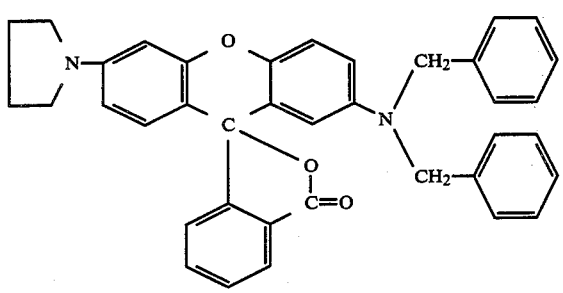
(H)
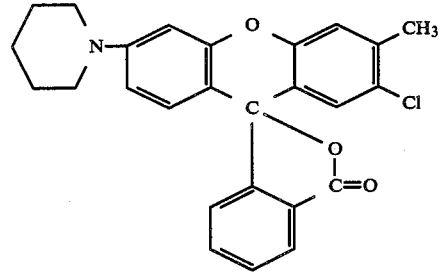
(I)
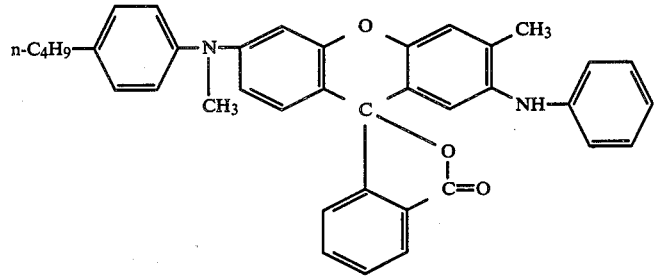

-continued
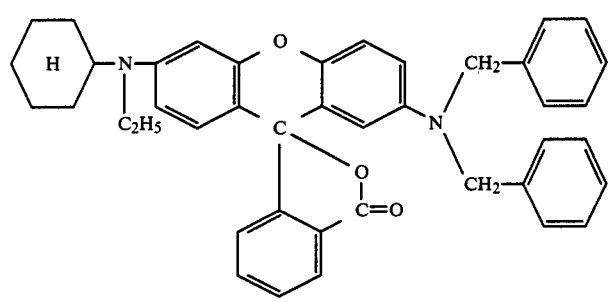
(J)
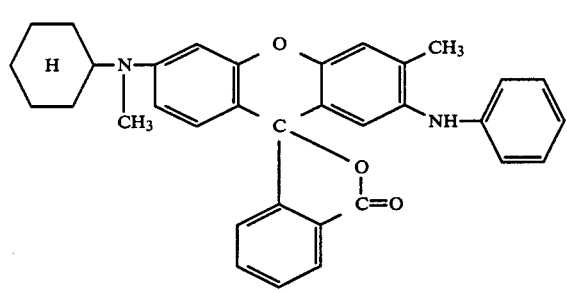
(K)
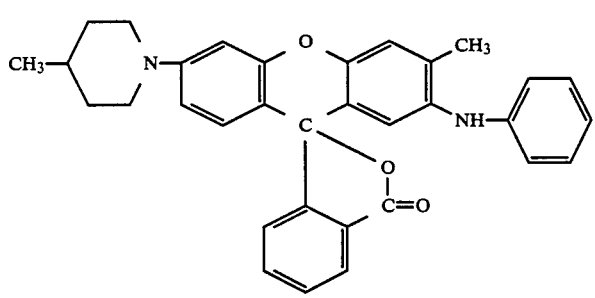
(L)
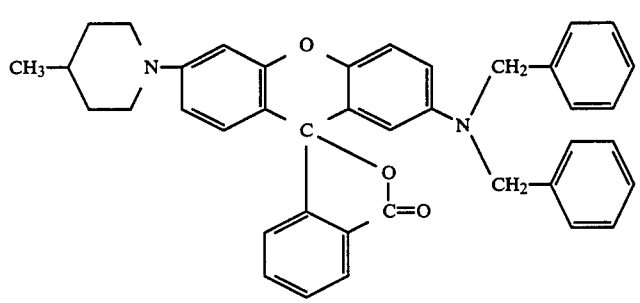
(M)
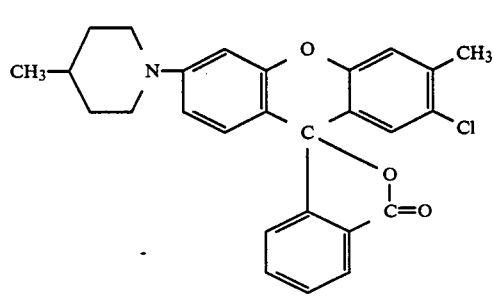
(N)

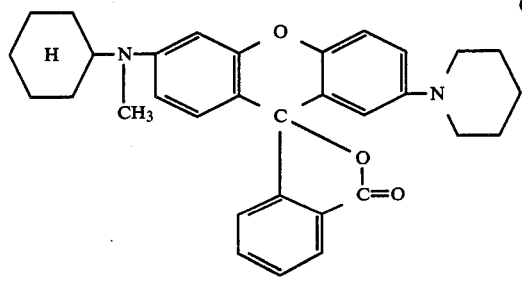 (O)

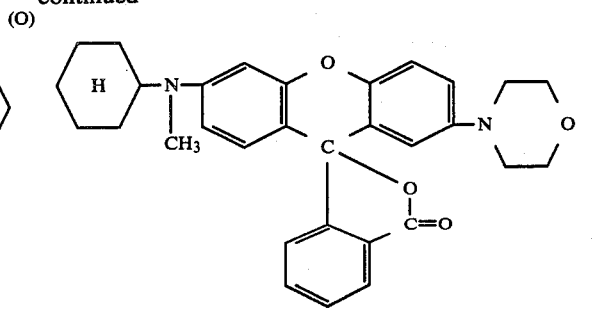 (P)

We have found that the fluoran derivatives of the general formula (I), which are used in the present invention, are (i) lower in a degree of self color developability and (ii) lower in degree of color development in aqueous dilute acid solutions than the aforesaid known fluoran derivatives, and have recognized that the fluoran derivatives of the present invention are extremely valuable as chromogenic materials for use in pressure-sensitive copying papers or heat-sensitive papers.

That is, in such manners as described below, we compared the known fluoran derivatives of the formulas (A) to (E) with the fluoran derivatives of the formulas (F) to (P) in self color developability and in color development degree in aqueous dilute acid solutions.

The comparison in self color developability was carried out in such a manner that 2% toluene solutions of individual compounds were spotted on Toyo Filter Papers No. 2, and colors developed at the spotted portions of the filter papers were compared. As the result, colors developed by the compounds (A) to (E) were markedly deep, whereas colors developed by the compounds (F) to (P) were markedly pale. Since heat-sensitive recording papers or heat-sensitive copying papers, for example, are prepared by coating the surfaces of papers with finely divided mixtures comprising such chromogenic materials as mentioned above and electron-accepting materials, e.g. bisphenol A, the above-mentioned comparative test results show that during preparation or prolonged storage of heat-sensitive recording papers or heat-sensitive copying papers, the papers using the compounds (A) to (E) become far greater in surface stains due to spontaneous coloration than the papers using the compounds (F) to (P).

The comparison in color development degree in aqueous dilute acid solution was carried out in such a manner that a mixture comprising 10 ml. of each of the aforesaid toluene solutions and 20 ml. of a 15% aqueous acetic acid solution was vigorously stirred for one minute and then allowed to stand still, and the coloration of the aqueous acetic acid solution was measured. As the result, the colors of aqueous acetic acid solution layers which were developed by the compounds (A) to (E) were far deeper than in the case of the compounds (F) to (P). The coloration degrees of the aqueous acetic acid solutions, as measured by means of a color difference meter, were as follows:

(A) E=16.43
(B) E=13.78
(C) E=11.88
(D) E=18.40
(E) E=23.32
(F) E=9.97
(G) E=2.54
(H) E=7.12
(I) E=1.39
(J) E=0.91
(K) E=1.04
(L) E=8.73
(M) E=2.34
(N) E=7.02
(O) E=6.34
(P) E=9.21

Thus, the compounds (F) to (P) have such advantageous characteristics that they are less soluble in dilute acids and far less colored with dilute acids than the compounds (A) to (E). This indicates the fact that at the step of forming an emulsion by coagulating the mixture of an aqueous gelatin solution and a solution of a chromogenic material in an inert organic solvent with a dilute acid so as to prepare microcapsules for use in pressure-sensitive copying papers, the coloration degree of the emulsion is far lower in the case where any of the compounds (F) to (P) is used as the chromogenic material than in the case where any of the compounds (A) to (E) is used.

The fluoran derivatives of the general formula (I) are excellent in color density when developed by contacting with electron-accepting materials, and hence are successfully usable for diazo copying. Furthermore, they are not only high in water resistance but also free from sublimation, and hence are extremely valuable novel substances as chromogenic materials for pressure-sensitive copying papers and heat-sensitive papers.

Colors developed by the fluoran derivatives of the general formula (I) on contact with electron-accepting materials range over such a wide scope as shown in Table 1. The colors developed by the said fluoran deriatives can be varied when the fluoran derivatives are incorporated with chromogenic materials that develop other colors, or the colors developed by the said chromogenic materials can be varied when the chromogenic materials are incorporated with fluoran derivatives of the general formula (I). Further, the fluoran derivatives can be enhanced in light fastness by incorporation of, for example, ultraviolet absorbers.

For application to pressure-sensitive copying sheet, the fluoran derivatives of the general formula (I) may be treated according to any of the processes disclosed in, for example, U.S. Pat. Nos. 2,548,366, 2,800,458 and 2,969,370, while for application to heat-sensitive recording materials, the fluoran derivatives may be treated according to any of the processes disclosed in, for example, Japanese Patent Publication Nos. 6,040/1965, 4,160/1968 and 14,093/1970.

Colors developed by the fluoran derivatives of the general formula (I), and the melting points thereof, are as set forth in Table 1.

TABLE 1
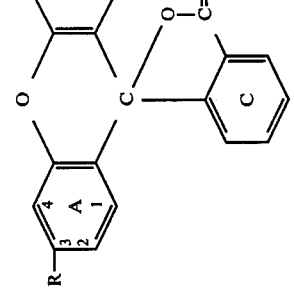
| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 1 |  | —H | —CH$_3$ | 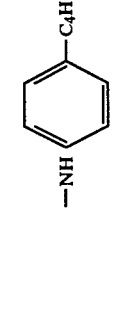 | —H | Dark purple | Dark green | 221–221.5 | |
| 2 | 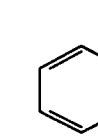 | —H | —CH$_3$ | 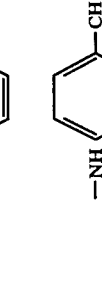 | —H | Black | Dark green | 174.5–176.5 | |
| 3 |  | —H | —H | 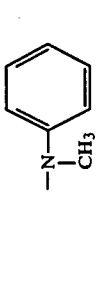 | —H | Green | Green | 220–222 | |
| 4 |  | —H | —H |  | —H | Blackish green | Green | 206–208.5 | |
| 5 |  | —H | —H | (phenyl)—N(CH$_3$)— | —H | Green | Green | 194–197 | |

TABLE 1-continued

[Structure: fluoran-type compound with substituents R, R₁, R₂, R₃, R₄ on rings A, B, and C with lactone group]

| | R | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 6 | pyrrolidinyl | —H | —CH₃ | —NH—C₆H₅ | —H | Dark purple | Dark green | 216–218 | |
| 7 | pyrrolidinyl | —CH₃ | —H | —NH₂ | —H | Dark reddish brown | Dark reddish brown | 268–271 | |
| 8 | pyrrolidinyl | —H | —H | —NH₂ | —H | Dark reddish brown | Dark reddish brown | 205–206 | |
| 9 | pyrrolidinyl | —CH₃ | —H | —NHCO—C₆H₅ | —H | Pinkish red | Red | 296–298 | |

TABLE 1-continued
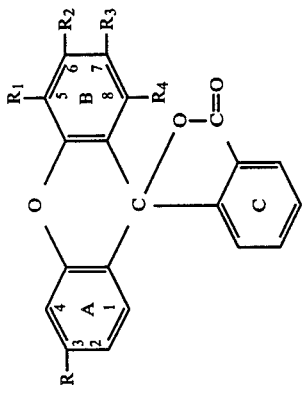
| | R | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 10 | pyrrolidine | —H | —H | —NH—CH(4-ClC₆H₄)₂ | —H | Blackish purple | Blackish green | 155–158 | |
| 11 | morpholine | —H | —H | —NHCH₃ | —H | Dark green | Green | 211–213 | |
| 12 | morpholine | —H | —H | —N(CH₂C₆H₅)CH₃ | —H | Green | Green | 166–167.5 | |
| 13 | morpholine | —CH₃ | —H | morpholine | —H | Greyish red | Greyish pink | 174–176 | |

TABLE 1-continued

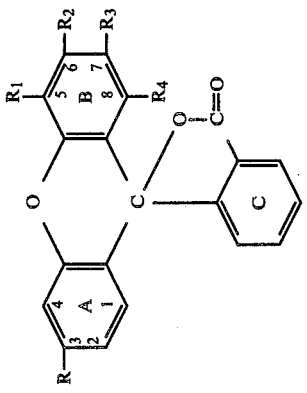

| | R | R1 | R2 | R3 | R4 | Colors developed on contact with electron-accepting materials Clay | Colors developed on contact with electron-accepting materials Resin | Melting point (°C.) | Remarks |
|---|---|---|---|---|---|---|---|---|---|
| 14 | morpholino (N-O ring) | —H | —H | piperidino | —H | Reddish purple | Pink | 176–178 | |
| 15 | pyrrolidino | —H | —H | pyrrolidino | —H | Green | Green | 269–272 | |
| 16 | pyrrolidino | —H | —H | —NH-cyclohexyl | —H | Dark green | Green | 168–170 | |
| 17 | morpholino | —H | —CH3 | —N(CH3)2 | —H | Dark red | Dark red | 87–90 | |

TABLE 1-continued

Structure:
Phthalide compound with rings A, B, C. Ring A has positions 1-4 with R substituent at position 3 (via ether linkage to ring B). Ring B has positions 5-8 with R₁ at 5, R₂ at 6, R₃ at 7, R₄ at 8. Ring C is the lactone phenyl.

| | R | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 18 | pyrrolidino | —H | —H | —N(CH₂C₆H₅)₂ | —H | Green | Green | 174–177 | |
| 19 | pyrrolidino | —H | —H | —C₆H₅ | —H | Pink | Pink | 184–187 | |
| 20 | pyrrolidino | —H | —OCH₃ | —H | —OCH₃ | Orange | Orange | 232–234 | |
| 21 | pyrrolidino | —H | —Cl | —H | —H | Testaceous | Dark red | 261–263 | |

TABLE 1-continued
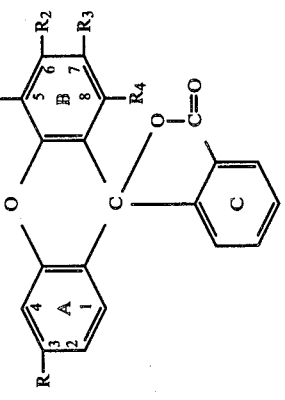
| R | | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 22 | piperidino | —H | —CH₃ | —Cl | —H | Red | Red | 250–252 | |
| 23 | pyrrolidino | —H | —H | 7,8-CH=CH—CH=CH— | | Pink | Pink | 281–283 | |
| 24 | pyrrolidino | —H | —H | NH₂<br>7,8-C=CH—CH=CH— | | Bluish purple | Blue | 252–255 | |
| 25 | pyrrolidino | —H | —H | NHCH₃<br>7,8-C=CH—CH=CH— | | Blue | Blue | 283–286 | |
| 26 | pyrrolidino | —H | —H | N(CH₃)₂<br>7,8-C=CH—CH=CH— | | Purple | Purple | 258–260 | |

TABLE 1-continued

| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 27 | pyrrolidinyl | —H | —H | ![phenyl-NHCH2-]; 7,8-C=CH—CH=CH— | | Blue | Blue | 285–288 | |
| 28 | pyrrolidinyl | —H | 5,6-CH=CH—CH=C—NH2 | ![dibenzylamino]; 7,8-C=CH—CH=CH— | | Purple | Purple | 165–168 | |
| 29 | piperidinyl | —H | —H | —H | —H | Purple | Purple | 212–214 | |
| 30 | morpholinyl | —H | —CH3 | ![-NH-phenyl-OC2H5] | —H | Dark green | Green | 180–183 | |

TABLE 1-continued

[Structure: fluoran with positions labeled - R on ring A (2-position), ring A fused via O to ring B with R1(5), R2(6), R3(7), R4(8); central C connected to ring C with C=O-O lactone]

| | R | R1 | R2 | R3 | R4 | Colors developed on contact with electron-accepting materials | | Melting point (°C.) | Remarks |
|---|---|---|---|---|---|---|---|---|---|
| | | | | | | Clay | Resin | | |
| 31 | pyrrolidino | 5,6-CH=CH—CH=C(NH—CH2Ph)— | | —H | —H | Blackish purple | Blackish purple | 167–170 | |
| 32 | pyrrolidino | —H | —H | —NH—CH(p-tolyl)2 | —H | Blackish purple | Blackish green | 182–185 | |
| 33 | pyrrolidino | —NH2 | —H | —CH3 | —H | Reddish pink | Reddish pink | 258–261 | |
| 34 | pyrrolidino | —H | —H | —Cl | —H | Reddish pink | Reddish pink | 287–290 | |

TABLE 1-continued

[Structure: fluoran-type compound with ring A (positions 1-4) bearing R substituent, ring B (positions 5-8) bearing R1, R2, R3, R4, ring C with C=O linkage, and bridging O and C]

| | R | R1 | R2 | R3 | R4 | Colors developed on contact with electron-accepting materials | | Melting point (°C.) | Remarks |
|---|---|---|---|---|---|---|---|---|---|
| | | | | | | Clay | Resin | | |
| 35 | pyrrolidin-1-yl | —H | —H | N-benzyl-N-cyclohexylamino | —H | Green | Green | 162–164 | |
| 36 | pyrrolidin-1-yl | —H | —H | piperidin-1-yl | —H | Dark red | Black | 210–212 | |
| 37 | pyrrolidin-1-yl | —H | —H | morpholin-4-yl | —H | Purple | Purple | 218–220 | |
| 38 | piperidin-1-yl | —H | —H | piperidin-1-yl | —H | Dark red | Black | 213–215 | |

TABLE 1-continued

| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 39 | cyclohexyl-N(CH₃)- | —H | —H | | 7,8-CH=CH—CH=CH— | Reddish pink | Reddish pink | 175-177 | |
| 40 | cyclohexyl-N(CH₃)- | —H | —H | | 7,8-CH=C(Br)—CH=CH— | Reddish pink | Reddish pink | 150-152 | |
| 41 | cyclohexyl-N(CH₃)- | —H | —CH₃ | —Cl | —H | Orange red | Orange red | 246-247 | |
| 42 | cyclohexyl-N(CH₃)- | —H | —H | —Cl | —H | Orange yellow | Orange yellow | 214-215 | |

TABLE 1-continued

| | R | R$_1$ | R$_2$ | R$_3$ | R$_4$ | Colors developed on contact with electron-accepting materials | | Melting point (°C.) | Remarks |
|---|---|---|---|---|---|---|---|---|---|
| | | | | | | Clay | Resin | | |
| 43 | cyclohexyl-N(CH$_3$)- | —H | —H | —C(CH$_3$)$_3$ | —H | Reddish orange | Reddish orange | 227-229 | |
| 44 | cyclohexyl-N(C$_2$H$_5$)- | —H | —H | phenyl | —H | Reddish orange | Red | 176-179 | |
| 45 | cyclohexyl-N(C$_2$H$_5$)- | —H | —H | —OCH$_3$ | —H | Red | Red | 98-102 | |

TABLE 1-continued

| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 46 | cyclohexyl-N(C$_2$H$_5$) | —H | —H | —C$_5$H$_{11}$ | —H | Orange | Orange red | 50–60 | |
| 47 | cyclohexyl-N(CH$_3$) | —Cl | —H | —Cl | —H | Orange yellow | Orange yellow | 280–282 | |
| 48 | cyclohexyl-N(C$_2$H$_5$) | —H | —H | —C$_8$H$_{17}$ | —H | Orange | Orange red | Oily | |
| 49 | cyclohexyl-N(C$_2$H$_5$) | —H | —CH$_3$ | —CH$_3$ | —H | Orange red | Red | 227–228 | |

TABLE 1-continued

| | R | $R_1$ | $R_2$ | $R_3$ | $R_4$ | Colors developed on contact with electron-accepting materials | | Melting point (°C.) Remarks |
|---|---|---|---|---|---|---|---|---|
| | | | | | | Clay | Resin | |
| 50 | cyclohexyl-N(C$_2$H$_5$)– | –H | –H | –N(CH$_2$C$_6$H$_5$)$_2$ | –H | Green | Green | 174–177 |
| 51 | cyclohexyl-N(CH$_3$)– | –H | –CH$_3$ | –NH-naphthyl | –H | Purple | Blackish purple | 172–175 |
| 52 | cyclohexyl-N(C$_2$H$_5$)– | –H | –H | –N(CH$_2$-C$_6$H$_4$-Cl)$_2$ | –H | Green | Green | 184–188 |

TABLE 1-continued
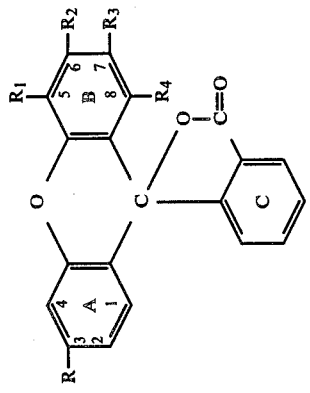
| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 53 | cyclohexyl-N(CH₃)- | —H | —CH₃ | -N(CH₂C₆H₅)₂ | —H | Dark red | Red | 100–105 | |
| 54 | cyclohexyl-N(CH₃)- | —H | —H | —NHCH₃ | —H | Blackish green | Green | 243–245 | |
| 55 | cyclohexyl-N(CH₃)- | —H | —CH₃ | —NH—n-C₈H₁₇ | —H | Greenish blue | Dark green | 197–199 | |

TABLE 1-continued

| | R | R$_1$ | R$_2$ | R$_3$ | R$_4$ | Colors developed on contact with electron-accepting materials | | Melting point (°C.) | Remarks |
|---|---|---|---|---|---|---|---|---|---|
| | | | | | | Clay | Resin | | |
| 56 | cyclohexyl-N(CH$_3$)– | —H | —H | —NH–cyclohexyl | —H | Black | Dark green | 193–194 | |
| 57 | cyclohexyl-N(C$_2$H$_5$)– | —H | —H | —NH–CH(phenyl)$_2$ | —H | Blackish purple | Blackish green | 146–150 | |
| 58 | cyclohexyl-N(CH$_3$)– | —H | —H | —N(CH$_3$)–CH$_2$-phenyl | —H | Dark green | Dark green | 195–197 | |
| 59 | cyclohexyl-NH– | —H | —CH$_3$ | —NH–phenyl | —H | Brown | Blackish brown | 223–224 | |

TABLE 1-continued

| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 60 | cyclohexyl-N(C₂H₅)– | —H | —H | —NH₂ | —H | Dark red | Dark red | 203–206 | |
| 61 | cyclohexyl-NH– | —H | —H | —NH-cyclohexyl | —H | Green | Green | 242–244 | |
| 62 | cyclohexyl-NH– | —H | —H | —NH-phenyl | —H | Blackish brown | Dark green | 225–226 | |
| 63 | cyclohexyl-N(CH₂-phenyl)– | —H | —CH₃ | —NH-phenyl | —H | Blackish brown | Dark green | 123–126 | |

TABLE 1-continued

Structure:

R₁, R₂, R₃, R₄ on ring B (positions 5,6,7,8); ring A with positions 1,2,3,4; R on ring A; ring C attached via C with O=C-O linkage.

| | R | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 64 | cyclohexyl-N(CH₃)- | —H | —CH₃ | —NH—C₆H₅ | —H | Black | Black | 195–197 | |
| 65 | cyclohexyl-N(CH₃)- | —H | —CH₃ | —NH—C₆H₄—C₄H₉ | —H | Black | Blackish green | 138–140 | |
| 66 | cyclohexyl-N(C₂H₅)- | —H | —CH₃ | —NH—C₆H₄—OC₂H₅ | —H | Black | Blackish green | 198–201 | |
| 67 | cyclohexyl-N(C₂H₅)- | —H | —CH₃ | —NH—C₆H₃(CH₃)₂ | —H | Black | Blackish green | 189–192 | |

TABLE 1-continued

[Structure: fluoran-type compound with positions labeled — ring A (with substituent R at position), ring B (with R$_1$ at 5, R$_2$ at 6, R$_3$ at 7, R$_4$ at 8), and ring C (phthalide with C=O).]

| | R | R$_1$ | R$_2$ | R$_3$ | R$_4$ | Colors developed on contact with electron-accepting materials | | Melting point (°C.) | Remarks |
|---|---|---|---|---|---|---|---|---|---|
| | | | | | | Clay | Resin | | |
| 68 | 4-methylpiperidino (H$_3$C–⟨N-piperidine⟩–N–) | —H | —CH$_3$ | —NH–C$_6$H$_5$ | —H | Blackish purple | Black | 174–176 | |
| 69 | 4-methylpiperidino | —H | —CH$_3$ | —NH–C$_6$H$_4$–C$_4$H$_9$ | —H | Black | Dark green | 160–163 | |
| 70 | 4-methylpiperidino | —CH$_3$ | —H | —NH–C$_6$H$_4$–CH$_3$ | —H | Green | Green | 200–203 | |
| 71 | 4-methylpiperidino | —H | —H | —NH–CH(4-ClC$_6$H$_4$)$_2$ | —H | Blackish purple | Blackish green | 148–151 | |

TABLE 1-continued
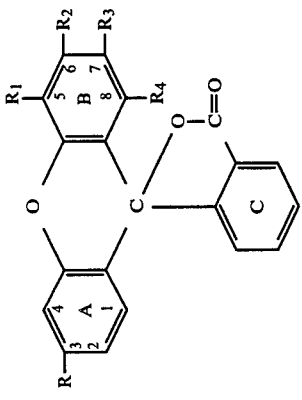
| | R | R1 | R2 | R3 | R4 | Clay | Resin | Melting point (°C.) | Remarks |
|---|---|---|---|---|---|---|---|---|---|
| 72 | 4-methylpiperidin-1-yl | —H | —H | —NH₂ | —H | Dark red | Dark red | 236–238 | |
| 73 | 4-methylpiperidin-1-yl | —H | —H | —NHCO-phenyl | —H | Red | Red | 255–258 | |
| 74 | 4-methylpiperidin-1-yl | —H | —H | —N(CH₂-phenyl)₂ | —H | Green | Green | 123–125 | |
| 75 | 4-methylpiperidin-1-yl | —H | —H | —NH-cyclohexyl | —H | Blackish green | Green | 198–201 | |

TABLE 1-continued
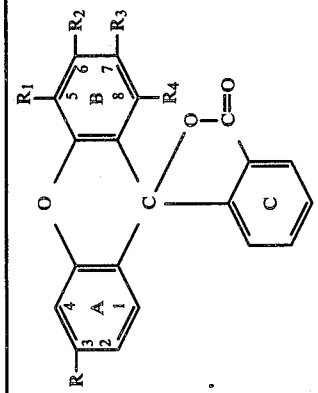
| | R | R₁ | R₂ | R₃ | R₄ | Colors developed on contact with electron-accepting materials Clay | Resin | Melting point (°C.) | Remarks |
|---|---|---|---|---|---|---|---|---|---|
| 76 | H₃C–⟨N⟩– | —H | —CH₃ | —NH–⟨C₆H₄⟩–OC₂H₅ | —H | Blackish green | Dark green | 186–188 | |
| 77 | H₃C–⟨N⟩– | —CH₃ | —H | —N(CH₃)–CH₂–⟨C₆H₄⟩–CH₃ | —H | Green | Green | 208–210 | |
| 78 | H₃C–⟨N⟩– | —H | —H | —NHCH₃ | —H | Blackish greenish blue | Green | 183–185 | |
| 79 | H₃C–⟨N⟩– | —H | —Cl | —H | —H | Red | Red | 115–117 | |
| 80 | H₃C–⟨N⟩– | —H | —CH₃ | —Cl | —H | Red | Red | 290–292 | |

TABLE 1-continued

[Structure: benzofuran-type leuco dye with substituents R on ring A (position 2,3), R1 at 5, R2 at 6, R3 at 7, R4 at 8 on ring B, and a phenyl-C=O-O group at C]

| | R | R1 | R2 | R3 | R4 | Colors developed on contact with electron-accepting materials | | Melting point (°C.) | Remarks |
|---|---|---|---|---|---|---|---|---|---|
| | | | | | | Clay | Resin | | |
| 81 | H3C—⟨N-piperidinyl⟩— | —H | —OCH3 | —H | —OCH3 | Red | Red | 190–192 | |
| 82 | H3C—⟨N-piperidinyl⟩— | —H | —CH3 | —H | —CH3 | Vermilion | Vermilion | 166–167 | |
| 83 | H3C—⟨N-piperidinyl⟩— | —H | —H | —OCH3 | —H | Purple | Reddish purple | 259–261 | |
| 84 | H3C—⟨N-piperidinyl⟩— | —Cl | —H | —Cl | —H | Red | Red | 246–248 | |
| 85 | H3C—⟨N-piperidinyl⟩— | —H | —H | —i-C8H17 | —H | Vermilion | Red | 140–142 | |

TABLE 1-continued

| | R | R₁ | R₂ | R₃ | R₄ | Colors developed on contact with electron-accepting materials | | Melting point (°C.) | Remarks |
|---|---|---|---|---|---|---|---|---|---|
| | | | | | | Clay | Resin | | |
| 86 | 4-methylpiperidino | —H | —H | —CH=CH—C=CH—<br>                            Br | | Pink | Pink | 242–243 | |
| 87 | 4-methylpiperidino | —H | —CH=CH—CH=CH— | —H | | Pink | Pink | 152–154 | |
| 88 | 4-methylpiperidino | —H | —H | —C=CH—CH=CH—<br>   NH₂ | —H | Blue | Blue | 182–183 | |
| 89 | 4-methylpiperidino | —H | —H | —C=CH—CH=CH—<br>   NHCOCH₃ | —H | Pink | Pink | 217–219 | |
| 90 | 4-methylpiperidino | —H | —H | —C=CH—CH=CH—<br>   NHCH₂—C₆H₅ | —H | Blue | Blue | 145–147 | |

TABLE 1-continued
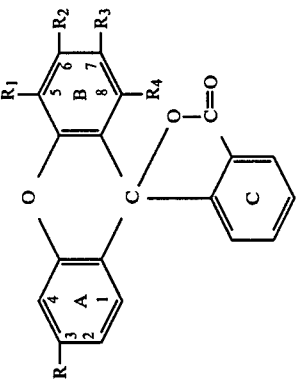
| | R | R1 | R2 | R3 | R4 | Colors developed on contact with electron-accepting materials | | Melting point (°C.) | Remarks |
|---|---|---|---|---|---|---|---|---|---|
| | | | | | | Clay | Resin | | |
| 91 | H3C—⟨N—⟩ | —H | —CH3 | —NH—C6H4—CH3 | —H | Black | Blackish green | 165–168 | |
| 92 | H3C—⟨N—⟩ | —H | —H | —CH3 | —H | Vermilion | Vermilion | 234–235 | |
| 93 | ⟨H-cyclohexyl⟩N(CH3)— | —H | —H | piperidino | —H | Brown | Brown | 249–251 | Blackish brown |
| 94 | ⟨H-cyclohexyl⟩N(CH3)— | —H | —H | morpholino | —H | Reddish brown | Dark red | 259–261 | Dark red |

TABLE 1-continued

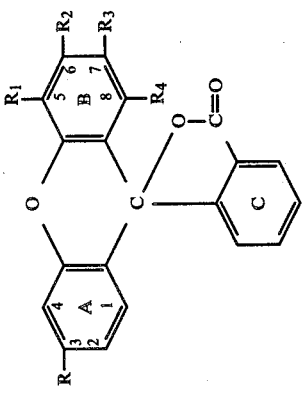

| | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 95 | cyclohexyl-N(CH₃)- | —H | —H | 4-methylpiperidin-1-yl | —H | Dark red | Blackish red | 204–207 | Black |
| 96 | cyclohexyl-N(CH₃)- | —H | —H | pyrrolidin-1-yl | —H | Green | Green | 272–275 | Green |
| 97 | cyclohexyl-N(CH₃)- | —CH₃ | —H | 4-methylpiperidin-1-yl | —H | Dark red | Blackish red | 213–215 | Black |
| 98 | cyclohexyl-N(CH₃)- | —H | —H | piperidin-1-yl | —H | Blackish brown | Green | 186–189 | Black |

TABLE 1-continued

Structure:
- Ring A (positions 1,2,3,4) with substituent R
- Ring B (positions 5,6,7,8) with R₁, R₂, R₃, R₄
- Ring C (phenyl with C=O, lactone)
- Connected via O and C bridges

| No. | R | $R_1$ | $R_2$ | $R_3$ | $R_4$ | Colors developed on contact with electron-accepting materials | | Melting point (°C.) | Remarks |
|---|---|---|---|---|---|---|---|---|---|
| | | | | | | Clay | Resin | | |
| 99 | —N(CH₃)—cyclohexyl-H | —H | —CH₃ | piperidinyl (—N⟨ring⟩) | —H | Red | Dark red | 202–204 | Dark red |

Note:
The compound Nos. 34 and 98 have, in addition to the above-mentioned substituents, 4-chlorine atoms on the benzene ring C. The colors set forth in the column "Remarks" are colors developed due to contact with metal salts of aromatic carboxylic acids.

The fluoran derivatives used in the present invention which are represented by the general formula,

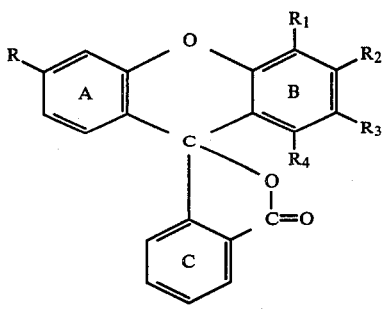

wherein R, $R_1$, $R_2$, $R_3$ and $R_4$ are as defined previously, can be prepared by reacting a benzophenone derivative of the general formula,

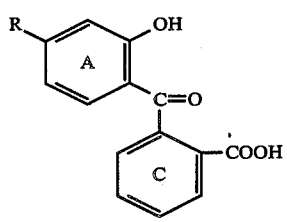

wherein R is as defined previously, with an equimolar amount of a phenol derivative of the general formula,

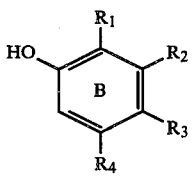

wherein $R_1$, $R_2$, $R_3$ and $R_4$ are as defined previously, is concentrated sulfuric acid at a temperature of $-10°$ to $+150°$ C.

The above-mentioned benzophenone derivative of the general formula (II) can be synthesized by fusing a mixture comprising 1 mole of a phenol derivative of the general formula,

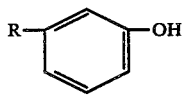

wherein R is as defined previously, and 1 to 2 moles of phthalic anhydride at 80° to 120° C. in the absence of solvent, or heating said mixture in an inert organic solvent such as toluene, xylene, trichlene or tetrachloroethane.

Concrete procedures for preparing the chromogenic materials used in the recording method of the present invention, and modes of practice of the present invention, are illustrated below with reference to preparation examples and examples, respectively, but it is needless to say that the scope of the invention is not limited to said examples.

PREPARATION EXAMPLE 1

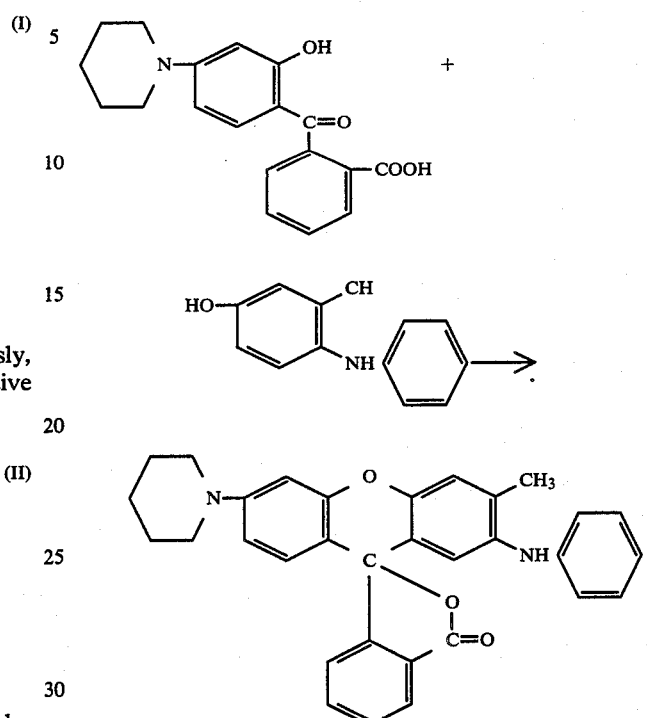

A mixture comprising 8 g. of 2-(4'-piperidino-2'-hydroxybenzoyl)benzoic acid and 5.4 g of 2-methyl-4-hydroxydiphenylamine was gradually added to 62 g. of concentrated sulfuric acid under stirring, and was reacted at 0° to 10° C. for 24 hours. The reaction liquid was charged into 300 ml. of ice water to form precipitates. The precipitates were recovered by filtration, washed with water and then hot extracted with 100 ml. of toluene. The extract was washed several times with each of aqueous acid and alkali solutions and then freed from the toluene by distillation. The residue was recrystallized from isopropyl alcohol to obtain 6.2 g. of 3-piperidine-6-methyl-7-anilinofluoran as crystals having a melting point of 221° to 221.5° C. which had been colored slightly to pale brown.

PREPARATION EXAMPLE 2

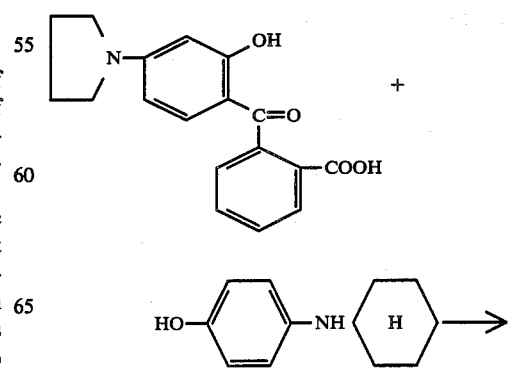

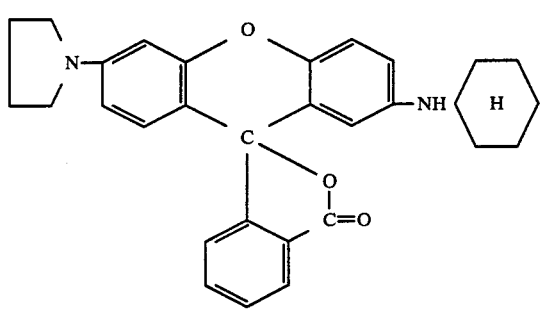
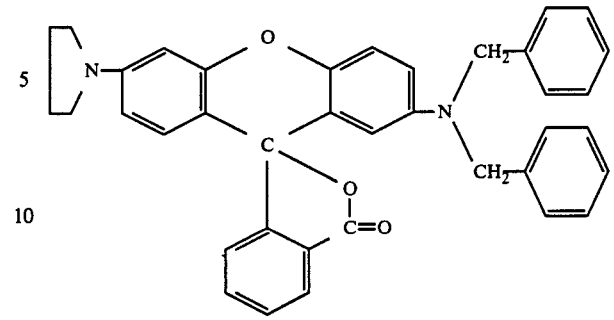

A mixture comprising 6 g. of 2-(4'-pyrrolidino-2'-hydroxybenzoyl)benzoic acid and 6 g. of p-cyclohexylaminophenol was gradually added to 30 g. of concentrated sulfuric acid under stirring, and was reacted at 70° C. to 90° C. for 4 hours. The reaction liquid was poured into 300 ml. of a 10% aqueous NaOH solution to form precipitates. The precipitates were recovered by filtration, washed with water and then treated in the same manner as in Preparation Example 1 to obtain 6.5 g. of 3-pyrrolidino-7-cyclohexylaminofluoran as white crystals having a melting point of 168° to 170° C.

PREPARATION EXAMPLE 3

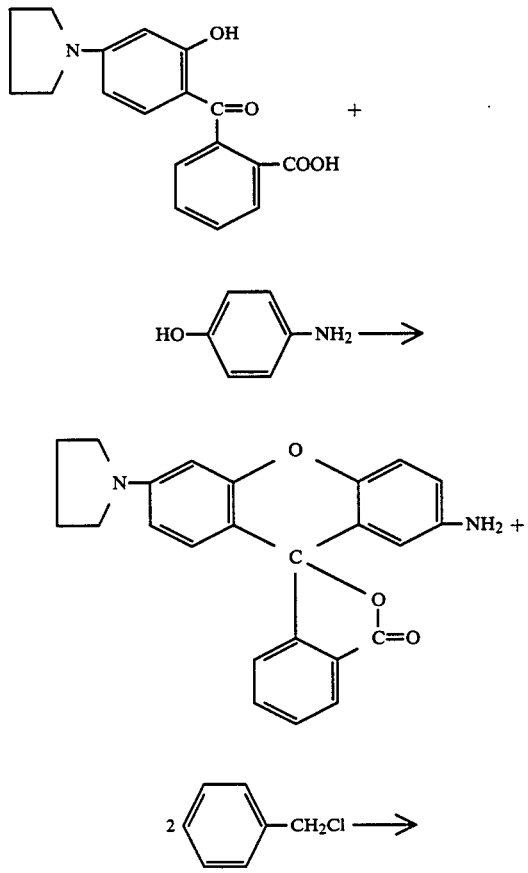

A mixture comprising 23 g. of 2-(4'-pyrrolidino-2'-hydroxybenzoyl)benzoic acid and 9.7 g. of p-aminophenol was gradually added to 90 g. of concentrated sulfuric acid under stirring, and was reacted at 100° to 110° C. for 2.5 hours. The reaction liquid was charged into 900 ml. of a 10% aqueous NaOH solution to form precipitates. The precipitates were recovered by filtration, washed with water, dried, and then recrystallized from 500 ml. of toluene to obtain 15 g. of white crystals of 3-pyrrolidino-7-aminofluoran having a melting point of 205° to 206° C. 5 Grams of the crystals were mixed with 6.5 g. of benzyl chloride and 50 ml. of xylene, and the resulting mixture was heated with stirring at 120° to 130° C. for 6 hours, subjected to steam distillation to remove unreacted benzyl chloride, and then extracted with 200 ml. of toluene. The toluene extract was washed several times with each of aqueous acid and alkali solutions, subjected to active carbon treatment and then freed from the toluene by distillation. The residue was recrystallized from 20 ml. of isopropyl alcohol to obtain 5.0 g. of 3-pyrrolidino-7-dibenzylaminofluoran as substantially white crystals having a melting point of 174° to 177° C.

PREPARATION EXAMPLE 4

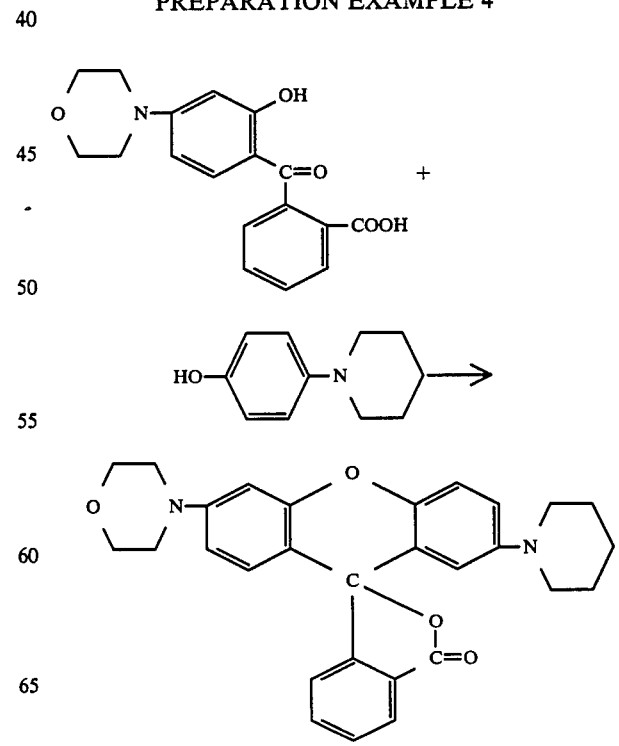

A mixture comprising 6.0 g. of 2-(4'-morpholino-2'-hydroxybenzoyl)benzoic acid and 4.0 g. of p-piperidinophenol was gradually added to 60 ml. of 80% sulfuric acid, and was reacted at 140° to 150° C. for 2 hours. The reaction liquid was poured into 600 ml. of a 10% aqueous NaOH solution to form precipitates. The precipitates were treated in the same manner as in Preparation Example 1 to obtain 4.2 g. of 3-morpholino-7-piperidinofluoran as white crystals having a melting point of 176° to 178° C.

The p-piperidinophenol used in the above was synthesized in the following manner:

110 Grams of hydroquinone was fused and, when the temperature thereof had reached 180° C., 85 g. of piperidine was gradually dropped into the hydroquinone over a period of one hour. After completion of the dropping, the resulting mixture was reacted at 180° to 200° C. for 5 hours, and then the temperature was lowered. When the temperature had lowered to about 100° C., the reaction liquid was charged into 500 ml. of water to deposit crystals. The crystals were recovered by filtration, washed with water and then dissolved in a dilute alkali solution. The resulting solution was subjected to active carbon treatment and then to filtration, and the filtration was adjusted to pH 6.0 to 6.5 by addition of dilute hydrochloric acid to obtain 143 g. of the p-piperidinophenol as white crystals having a melting point of 155° to 157° C.

PREPARATION EXAMPLE 5

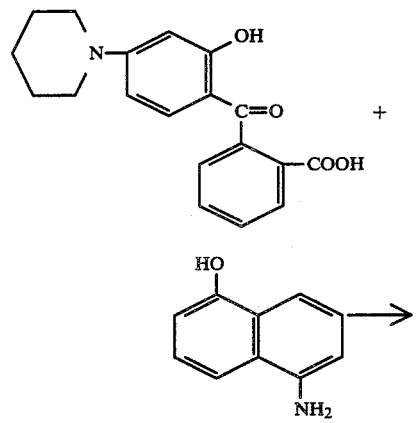

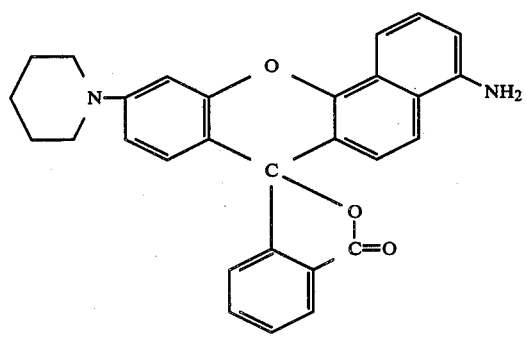

A mixture comprising 8.5 g. of 2-(4'-piperidino-2'-hydroxybenzoyl)benzoic acid and 4.0 g. of 5-amino-1-naphthol was gradually added to 60 g. of concentrated sulfuric acid under stirring, and was reacted at 75° to 85° C. for 3 hours. The reaction liquid was allowed to stand at room temperature for 12 hours, and then charged into 500 ml. of a 10% aqueous NaOH solution, whereby large quantities of brown crystals were deposited. The crystals were recovered by filtration thoroughly washed with water and then dried to give 10 g. of a crude product. This crude product was recrystallized from 100 ml. of toluene to obtain 6.8 g of a 3-piperidino-5,6-benzofluoran derivative of the above formula as substantially white crystals having a melting point of 212° to 214° C.

PREPARATION EXAMPLE 6

A mixture comprising 18 g. of 2-[4'-(N-methyl-N-cyclohexylamino)-2'-hydroxybenzoyl]benzoic acid of the formula,

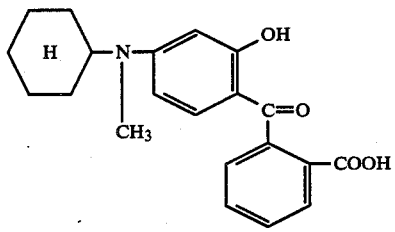

10 g. of β-naphthol and 90 g. of concentrated sulfuric acid was heated with stirring at 80° to 100° C. for 2 hours. The reaction mixture was gradually added to 300 ml. of ice water to deposit crystals. The crystals were recovered by filtration, washed with water and then dried to obtain 25 g. of crude 3-(N-methyl-N-cyclohexylamino)-7,8-benzofluoran of the formula,

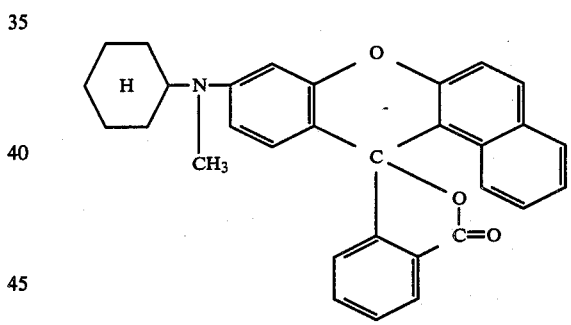

This crude product was extracted with 250 ml. of toluene. The toluene extract was washed several times with a 10% aqueous NaOH solution, charged with 1.4 g. of active carbon, subjected to filtration and then freed from the toluene by distillation under reduced pressure, whereby 21 g. of said fluoran derivative was obtained as substantially white crystals having a melting point of 175° C. to 177° C.

PREPARATION EXAMPLE 7

A mixture comprising 9 g. of 2-[4'-(N-methyl-N-cyclohexylamino)-2'-hydroxybenzoyl]benzoic acid, 4 g. of 3-methyl-4-chlorophenol, 80 g. of concentrated sulfuric acid and 20 g. of water was heated with stirring at 80° to 130° C. for 5 hours. The reaction mixture was gradually added to 150 ml. of ice water to deposit crystals. The crystals were recovered by filtration, washed with water and then dried to obtain 12 g. of crude 3-(N-methyl-N-cyclohexylamino)-6-methyl-7-chlorofluoran of the formula,

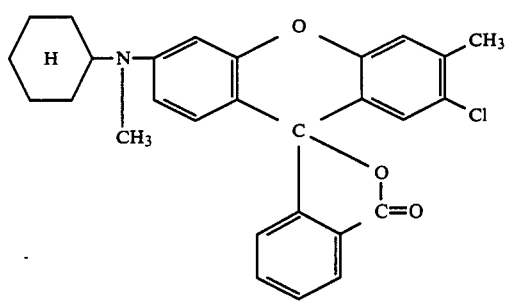

This crude product was treated in the same manner as in Preparation Example 6, whereby 10 g. of said fluoran derivative was obtained as white crystals having a melting point of 246° to 247° C.

PREPARATION EXAMPLE 8

A mixture comprising 25 g. of 2-[4'-(N-ethyl-N-cyclohexylamino)-2'-hydroxybenzoyl]benzoic acid of the formula,

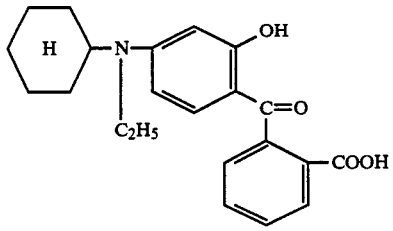

10 g. of p-phenylphenol and 200 g. of 70% sulfuric acid was heated at 110° to 135° C. for 4 hours. The reaction mixture was gradually added to 500 ml. of ice water to deposit crystals. The crystals were recovered by filtration, washed with water and then dried to obtain 30 g. of crude 3-(N-ethyl-N-cyclohexylamino)-7-phenylfluoran of the formula,

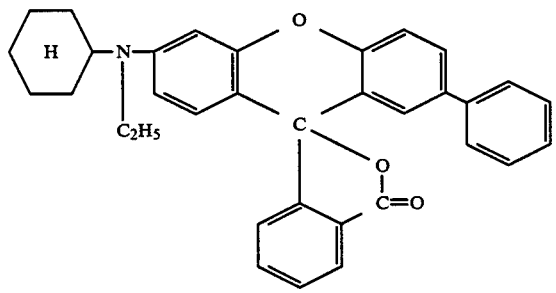

This crude product was extracted with 300 ml. of toluene, and the extract was treated in the same manner as in Preparation Example 6, whereby 27 g. of said fluoran derivative was obtained as substantially white crystals having a melting point of 176° to 179° C.

PREPARATION EXAMPLE 9

A mixture comprising 18 g. of 2-[4'-(N-methyl-N-cyclohexylamino)-2'-hydroxybenzoyl]benzoic acid, 0.8 g. of p-tert. butylphenol and 130 g. of 90% sulfuric acid was reacted at 70° to 100° C. for 10 hours. The reaction mixture was gradually added to 650 ml. of ice water to deposit crystals. The crystals were recovered by filtration, washed with water and then dried to obtain 24 g. of crude 3-(N-methyl-N-cyclohexylamino)-7-tert.-butylfluoran of the formula,

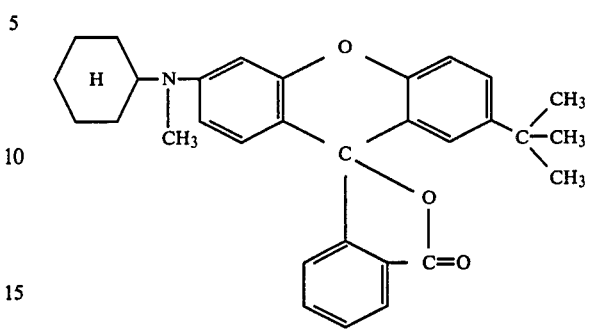

This crude product was extracted with 240 ml. of toluene, and the extract was treated in the same manner as in Preparation Example 6, whereby 20.5 g. of said fluoran derivative was obtained as substantially white crystals having a melting point of 227° to 229° C.

PREPARATION EXAMPLE 10

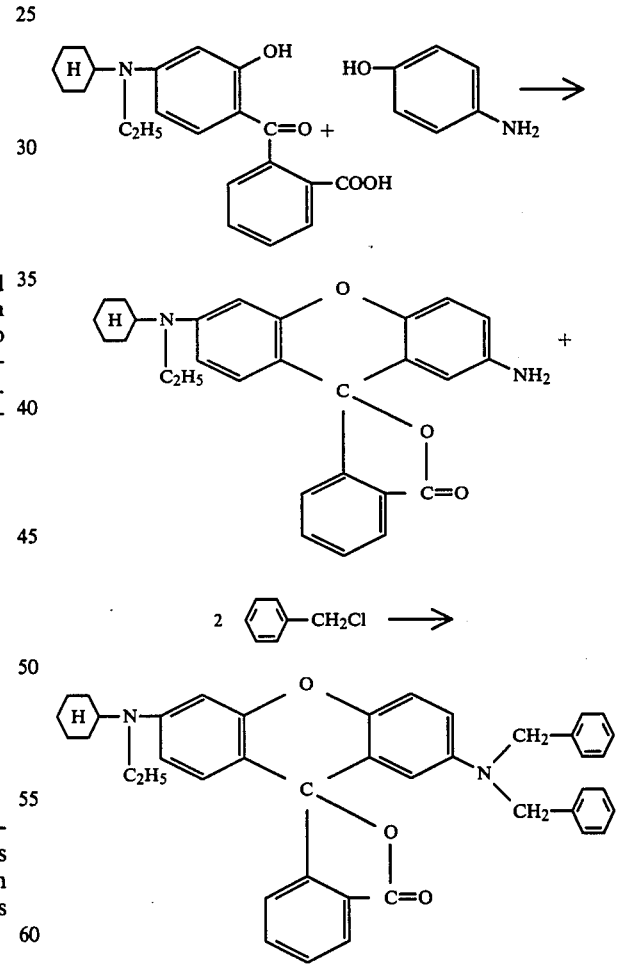

A mixture comprising 20 g. of 2-[4'-(N-ethyl-N-cyclohexylamino)-2'-hydroxybenzoyl]benzoic acid and 7.2 g. of p-aminophenol was gradually added to 90 g. of concentrated sulfuric acid under stirring, and was reacted at 40° to 50° C. for 8 hours. The reaction liquid was charged into 800 ml. of a 10% aqueous NaOH solution to form precipitates. The precipitates were recovered by filtration, dried and then recrystallized from 300 ml. of toluene to obtain 20 g. of pale brown crystals of 3-(N-ethyl-N-cyclohexylamino)-7-aminofluoran having a melting point of 203° to 206° C. 4 Grams of this aminofluoran was mixed with 5 g. of benzyl chloride and 50 ml. of xylene, and the resulting mixture was heated with stirring at 120° to 130° C. for 6 hours, subjected to steam distillation to remove unreacted benzyl chloride, and then extracted with 100 ml. of toluene. The toluene extract was washed several times with each of aqueous acid and alkali solutions, subjected to active carbon treatment and then freed from the toluene by distillation. The residue was recrystallized from 20 ml. of isopropyl alcohol to obtain 4.2 g. of 3-(N-ethyl-N-cyclohexylamino)-7-dibenzylaminofluoran as pale yellowish white crystals having a melting point of 174° to 177° C.

PREPARATION EXAMPLE 11

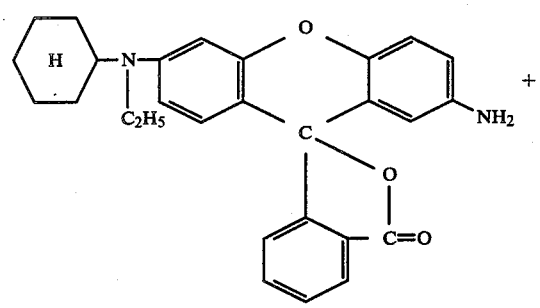

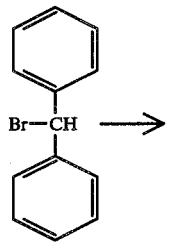

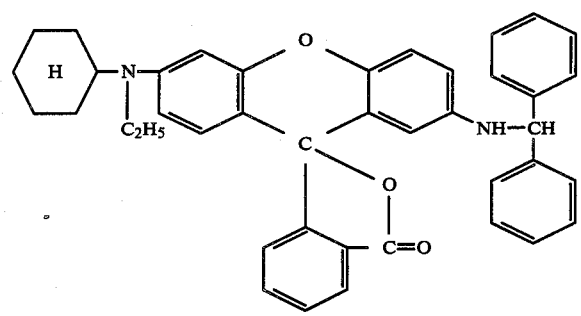

4 Grams of the 3-(N-ethyl-N-cyclohexylamino)-7-aminofluoran prepared in Preparation Example 10 was reacted with 2.7 g. of diphenylmethane bromide in 50 ml. of xylene at 120° to 130° C. for 5 hours. The reaction liquid was subjected to steam distillation to remove unreacted diphenyl methane bromide and xylene and then extracted with 50 ml. of toluene. The toluene extract was washed several times with each of aqueous acid and alkali solutions and then freed from the toluene by distillation under reduced pressure. The residue was recrystallized from 20 ml. of methanol to obtain 3.5 g. of 3-(N-ethyl-N-cyclohexyl)-7-diphenyl-methylaminofluoran as pale greenish white crystals having a melting point of 146° to 150° C.

PREPARATION EXAMPLE 12

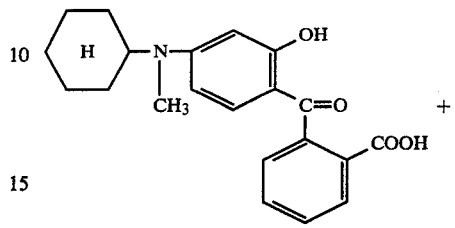

A mixture comprising 22 g. of 2-[4'-(N-methyl-N-cyclohexylamino)-2'-hydroxybenzoyl]benzoic acid and 1.5 g. of 2-methyl-4-hydroxy-p-n-octylphenylamine was gradually added to 20 g. of concentrated sulfuric acid under stirring, and was reacted at 15° to 20° C. for 24 hours.

The reaction liquid was poured into 200 ml. of ice water to form precipitates. The precipitates were recovered by filtration and extracted with 50 ml. of toluene. The toluene extract was washed several times with each of aqueous acid and alkali solutions, subjected to active carbon treatment and then freed from the toluene by distillation under reduced pressure. The residue was recrystallized from hexane to obtain 1.8 g. of 3-(N-methyl-N-cyclohexyl)-6-methyl-7-n-octylaminofluoran as substantially white crystals having a melting point of 197° to 199° C.

The 2-methyl-4-hydroxy-p-n-octylphenylamine used in the above was synthesized in the following manner:

A mixture comprising 24.6 g of 3-methyl-4-aminophenol, 31.2 g. of p-n-octylaniline hydrochloride and 5 g. of ZnCl₂ was heated at 190° to 210° C. for 4 hours, adjusted to pH 7.0 and extracted with 200 ml. of toluene. The toluene extract was thoroughly washed with water and then subjected to vacuum distillation, whereby 45 g. of the said octyldiphenylamine was obtained at 180°–200° C./5 mmHg.

PREPARATION EXAMPLE 13

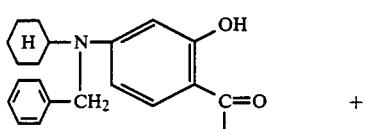

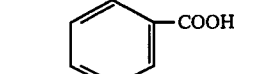

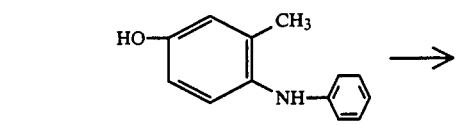

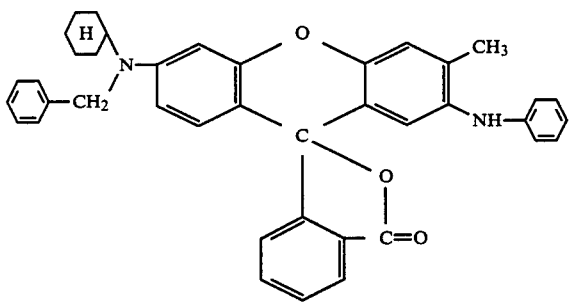

A mixture comprising 4.3 g. of 2-[4'-(N-benzyl-N-cyclohexylamino)-2'-hydroxybenzoyl]benzoic acid and 2.0 g. of 2-methyl-4-hydroxy-diphenylamine was gradually added to 4.0 g. of concentrated sulfuric acid under stirring, and was reacted at 0° to 10° C. for 8 hours. The reaction liquid was poured into 200 ml. of ice water to form precipitates. The precipitates were recovered by filtration, washed with water and then hot extracted with 100 ml. of toluene. The extract was washed several times with each of aqueous acid and alkali solutions and then freed from the toluene by distillation. The residue was recrystallized from isopropyl alcohol to obtain 3.8 g. of 3-(N-benzyl-N-cyclohexylamino)-6-methyl-7-anilinofluoran as substantially white crystals having a melting point of 123° to 126° C.

PREPARATION EXAMPLE 14

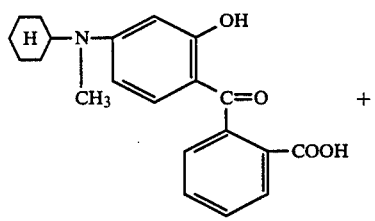

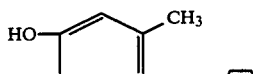

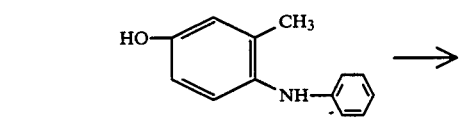

-continued

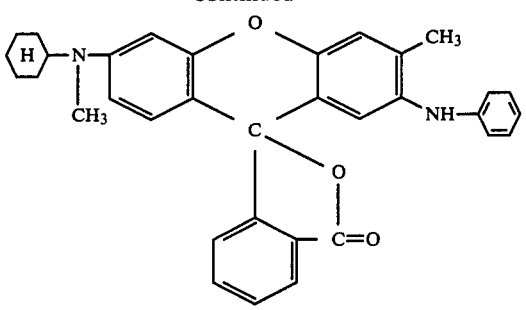

A mixture comprising 4 g. of 2-[4'-(N-methyl-N-cyclohexylamino)-2'-hydroxybenzoyl]benzoic acid and 2.3 g. of 2-methyl-4-hydroxydiphenylamine was gradually added to 30 g. of concentrated sulfuric acid under stirring, and was reacted at 0° to 5° C. for 24 hours. The reaction liquid was gradually poured into 100 ml. of ice water to deposit crystals. The crystals were recovered by filtration and then dried to obtain crude 3-(N-methyl-N-cyclohexylamino)-6-methyl-7-anilinofluoran of the formula,

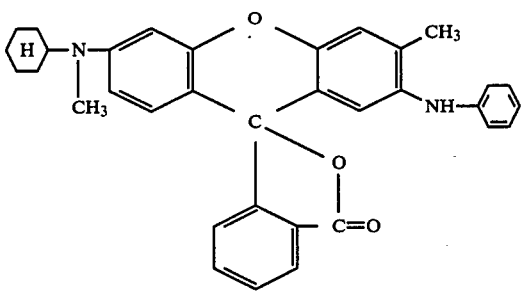

This crude product was charged with 50 ml. of toluene and 50 ml. of a 10% aqueous sodium hydroxide solution, and the resulting liquid was stirred at an elevated temperature to form a toluene layer containing the above fluoran derivative. The toluene layer was washed several times with dilute hydrochloric acid (3%), subjected to active carbon treatment and freed from the toluene. The residue was recrystallized from 20 ml. of isopropyl alcohol to obtain 4 g. of said fluoran derivative as pale yellowish white crystals having a melting point of 195° to 197° C.

PREPARATION EXAMPLE 15

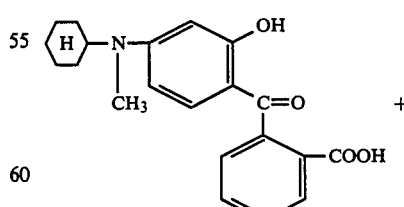

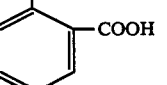

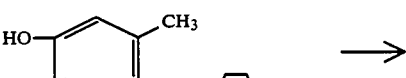

-continued

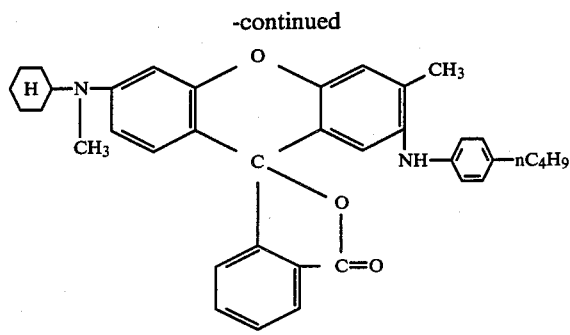

A mixture comprising 5 g. of 2-[4'-(N-methyl-N-cyclohexylamino)-2'-hydroxybenzoyl]benzoic acid and 3.5 g. of 2-methyl-4-hydroxy-p-n-butyldiphenylamine was gradually added to 40 g. of concentrated sulfuric acid under stirring, and was reacted at 0° to 20° C. for 12 hours. The reaction liquid was gradually poured into 100 ml. of ice water to deposit crystals. The crystals were recovered by filtration and then dried to obtain crude 3-(N-methyl-N-cyclohexylamino)-6-methyl-7-p-n-butyl-anilinofluoran of the formula,

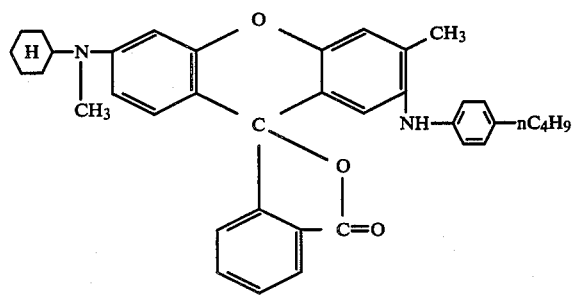

This crude product was treated in the same manner as in Preparation Example 14, whereby 3.5 g. of said fluoran derivative was obtained as pale brown crystals having a melting point of 138° to 140° C.

PREPARATION EXAMPLE 16

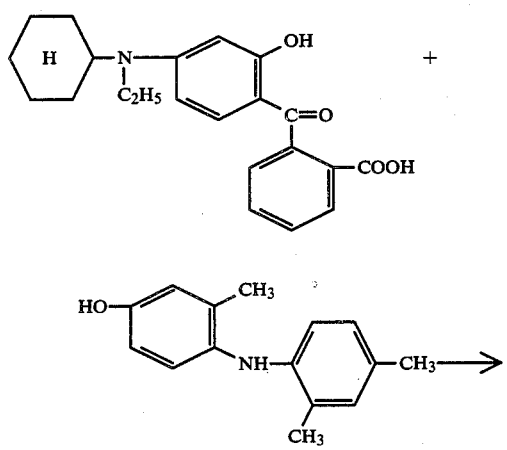

-continued

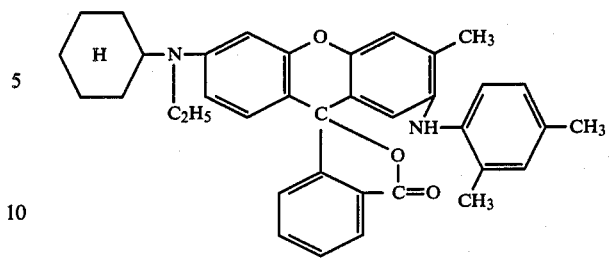

A mixture comprising 3.7 g. of 2-[4'-(N-ethyl-N-cyclohexylamino)-2'-hydroxybenzoyl]benzoic acid and 2.8 g. of 2-methyl-4-hydroxy-2',4'-dimethyldiphenylamine was gradually added to 30 g. of concentrated sulfuric acid under stirring, and was reacted at −2° to +10° C. for 24 hours. The reaction liquid was gradually poured into 100 ml. of ice water to deposit crystals. The crystals were recovered by filtration and then dried to obtain crude 3-(N-ethyl-N-cyclohexylamino)-6-methyl-7-o,p-dimethylanilinofluoran of the formula,

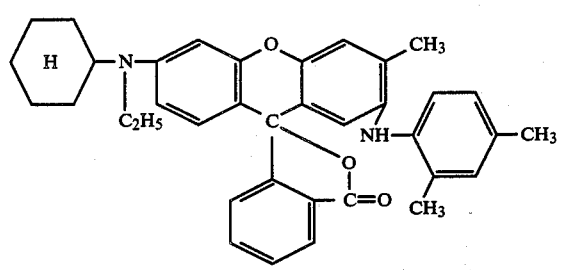

This crude product was treated in the same manner as in Preparation Example 14, whereby 3.2 g. of said fluoran derivative was obtained as pale yellow crystals having a melting point of 189° to 192° C.

PREPARATION EXAMPLE 17

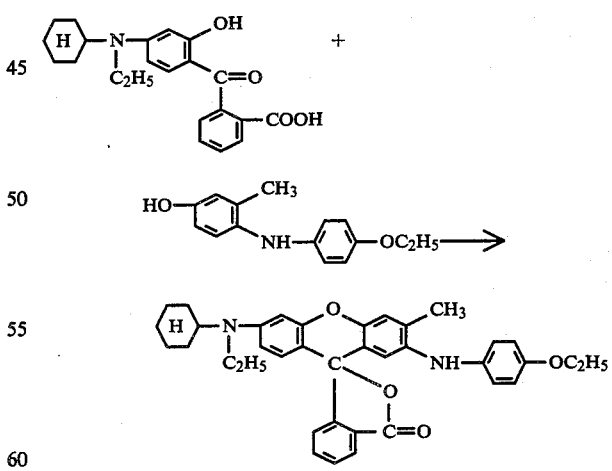

A mixture comprising 4 g. of 2-[4'-(N-ethyl-N-cyclohexylamino)-2'-hydroxybenzoyl]benzoic acid and 2.8 g. of 2-methyl-4-hydroxy-4'-ethoxydiphenylamine was gradually added to 20 g. of concentrated sulfuric acid under stirring and was reacted at 0° to +10° C. for 20 hours. The reaction liquid was gradually poured into 100 ml. of ice water to deposit crystals. The crystals were recovered by filtration and then dried to obtain crude 3-(N-ethyl-N-cyclohexylamino)-6-methyl-7-ethoxyanilinofluoran of the formula,

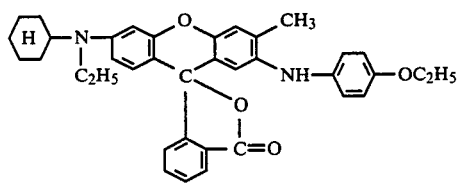

This crude product was treated in the same manner as in Preparation Example 14, whereby 4.2 g. of said fluoran derivative was obtained as pale brown crystals having a melting point of 198° to 201° C.

PREPARATION EXAMPLE 18

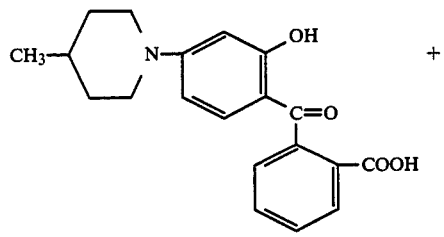

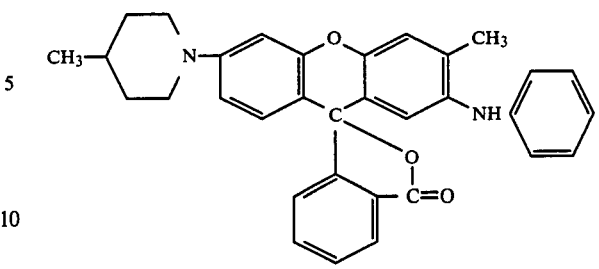

A mixture comprising 1.3 g. of 2-[4'-(p-methylpiperidino)-2'-hydroxybenzoyl]benzoic acid and 5.4 g. of 2-methyl-4-hydroxydiphenylamine was gradually added to 11.4 g. of concentrated sulfuric acid under stirring, and was reacted at −2° to +10° C. for 24 hours. The reaction liquid was poured into 60 ml. of ice water to form precipitates. The precipitates were recovered by filtration, washed with water and then hot extracted with 30 ml. of toluene. The extract was washed several times with each of aqueous acid and alkali solutions and then freed from the toluene by distillation. The residue was recrystallized from 20 ml. of isopropyl alcohol to obtain 1.8 g. of p-methylpiperidino-6-methyl-7-anilinofluoran as a pale brown crystals having a melting point of 174° to 176° C. which had been colored slightly to pale brown.

PREPARATION EXAMPLE 19

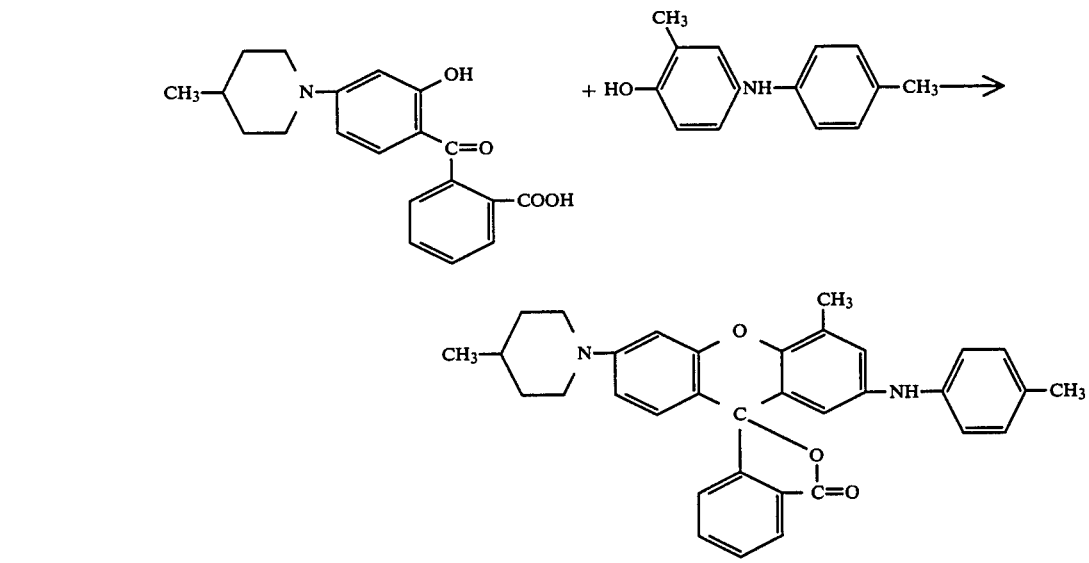

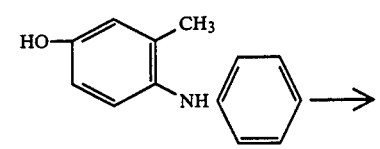

A mixture comprising 5 g. of 2-[4'-(p-methylpiperidino)-2'-hydroxybenzoyl]benzoic acid and 3.1 g. of 4-hydroxy-3-methyl-p-methyldiphenylamine was gradually added to 40 g. of concentrated sulfuric acid under stirring and was reacted at −2° to +5° C. for 48 hours. The reaction liquid was poured into 100 ml. of ice water to form precipitates. The precipitates were recovered by filtration, washed with water and then hot extracted with 80 ml. of toluene. The toluene extract was washed several times with each of aqueous acid and alkali solutions and then mixed with 80 ml. of a 1% aqueous hydrosulfite solution. The resulting mixture was boiled, subjected to filtration to remove a small amount of precipitate. The separated toluene layer, washed several times with water and then freed from the toluene by distillation. The residue was recrystallized from isopropyl alcohol to obtain 3.5 g. of 3-p-methylpiperidino-5-methyl-7-p-toluidinofluoran as white crystals having a melting point of 200° to 203° C.

crystals. The crystals were recovered by filtration, washed with a small amount of isopropyl alcohol and then dried to obtain 3.5 g. of 3-p-methylpiperidino-6-methyl-8-methylfluoran as white crystals having a melting point of 166° to 167° C.

PREPARATION EXAMPLE 20

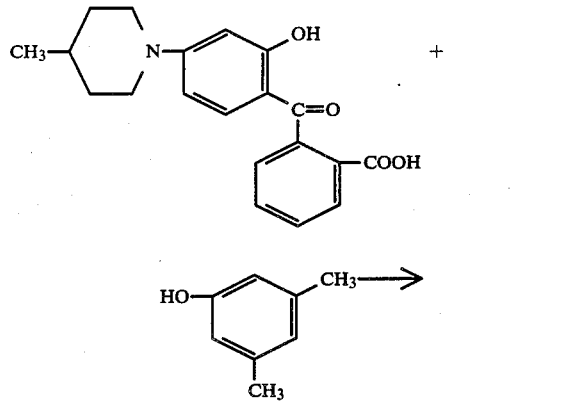

PREPARATION EXAMPLE 21

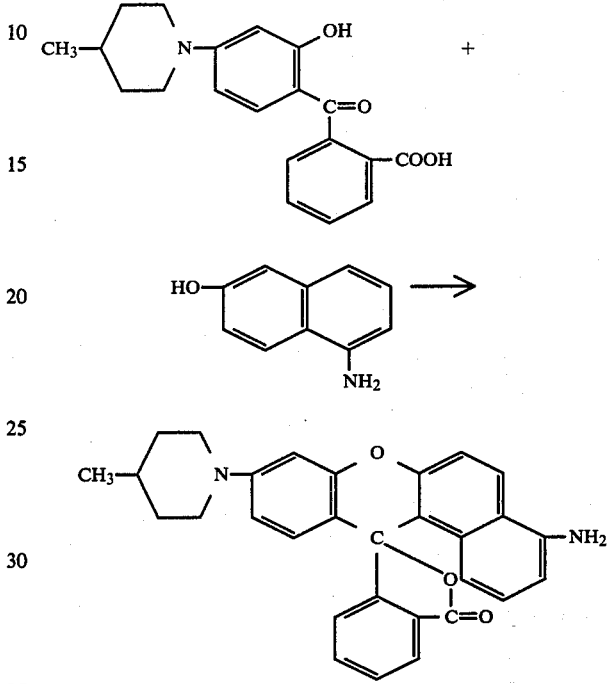

A mixture comprising 3.5 g. of 2-[4'-(p-methylpiperidino)-2'-hydroxybenzoyl]benzoic acid and 1.3 g. of 3,5-dimethylphenol was added to 22 g. of 80% sulfuric acid under stirring, and was reacted at 120° to 130° C. for 4 hours. The reaction liquid was gradually poured, with cooling, into 150 ml. of a 10% aqueous NaOH solution to form precipitates. The precipitates were recovered by filtration, washed with water and then extracted with 50 ml. of toluene. The toluene extract was washed several times with an aqueous alkali solution and then freed from the toluene by distillation. The residue was mixed with 50 ml. of isopropyl alcohol, and the resulting mixture was boiled and then allowed to stand overnight in an ice chamber to deposit white A mixture comprising 4.7 g. of 2-[4'-(p-methylpiperidino)-2'-hydroxybenzoyl]benzoic acid and 2.2 g. of 5-amino-2-naphthol was gradually added to 36 g. of 80% sulfuric acid under stirring, and was reacted at 110° to 120° C. for 2 hours. The reaction liquid was poured into 200 ml. of ice water to deposit crystals. The crystals were recovered by filtration and then treated in the same manner as in Preparation Example 20 to obtain 4.0 g. of 4-amino-8-p-methylpiperidino-benzo(α)fluoran as crystals having a melting point of 181° to 183° C. which had been colored slightly to green.

PREPARATION EXAMPLE 22

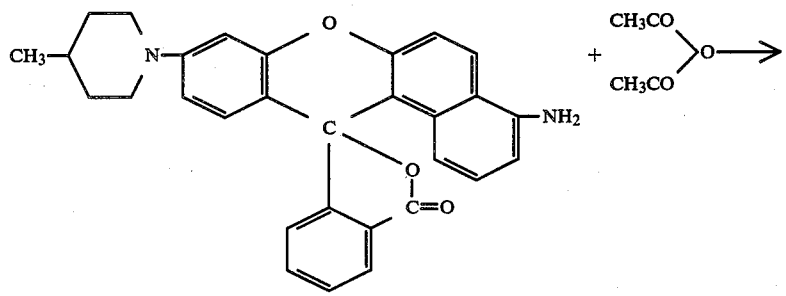

-continued

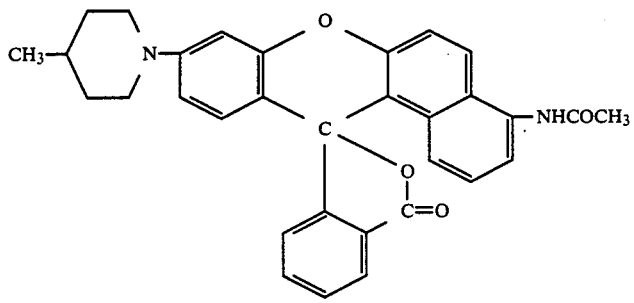

2 Grams of the 4-amino-8-p-methylpiperidino-benzo(α)fluoran obtained in Preparation Example 21 was dissolved in 5 g. of glacial acetic acid. The resulting solution was charged with 2.0 g. of acetic anhydride, refluxed with stirring for 3 hours, poured into 50 ml. of ice water, adjusted to pH 9.0 with an NaOH solution, and then hot extracted with 30 ml. of toluene. The toluene extract was washed several times with an aqueous alkali solution, and then freed from the toluene by distillation. The residue was mixed with 20 ml. of isopropyl alcohol, and the resulting mixture was boiled and then cooled with ice to obtain 1.8 g. of 4-acetylamino-8-p-methylpiperidino-benzo(α)fluoran as white crystals having a melting point of 217° to 219° C.

PREPARATION EXAMPLE 23

A mixture comprising 18 g. of 2-[4'-(N-methyl-N-cyclohexylamino)-2'-hydroxybenzoyl]benzoic acid, 9.0 g. of p-piperidinophenol and 90 ml. of 90% sulfuric acid was heated with stirring at 80° to 100° C. for 2 hours. The reaction mixture was gradually added to 300 ml. of ice water to deposit crystals. The crystals were recovered by filtration and then washed with water to obtain 23 g. of crude 3-(N-methyl-N-cyclohexylamino)-7-piperidinofluoran of the formula,

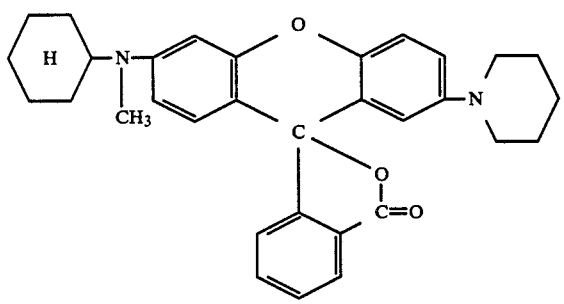

The crude product was extracted with 230 ml. of toluene. The toluene extract was washed several times with a 10% aqueous NaOH solution, subjected to filtration using 2 g. of active carbon and then freed from the toluene by distillation under reduced pressure, whereby 18 g. of said fluoran derivative was obtained as substantially white crystals having a melting point of 249° to 251° C.

PREPARATION EXAMPLE 24

A mixture comprising 18 g. of 2-[4'-(N-methyl-N-cyclohexylamino)-2'-hydroxybenzoyl]benzoic acid, 8.5 g. of p-pyrrolidinophenol and 80 g. of concentrated sulfuric acid was heated with stirring at 50° to 80° C. for 5 hours. The reaction mixture was gradually poured into 400 ml. of ice water to deposit crystals. The crystals were recovered by filtration, washed with water and then dried to obtain 19.5 g. of crude 3-(N-methyl-N-cyclohexylamino)-7-pyrrolidinofluoran of the formula,

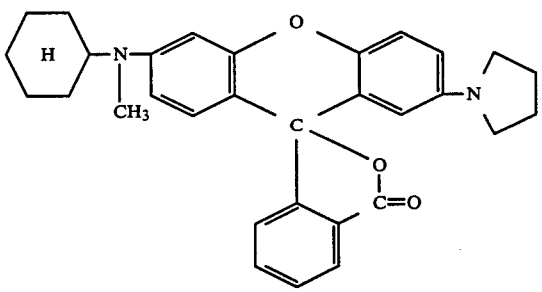

The crude product was treated in the same manner as in Preparation Example 23, whereby 16.5 g. of said fluoran derivative was obtained as white crystals having a melting point of 272° to 275° C.

PREPARATION EXAMPLE 25

A mixture comprising 18 g. of 2-[4'-(N-methyl-N-cyclohexylamino)-2'-hydroxybenzoyl]benzoic acid, 10 g. of p-morpholinophenol and 180 ml. of 90% sulfuric acid was heated at 90° to 100° C. for 3 hours. The reaction mixture was gradually added to 500 ml. of ice water to deposit crystals. The crystals were recovered by filtration and then washed with water to obtain 18 g. of crude 3-(N-methyl-N-cyclohexylamino)-7-morpholinofluoran of the formula,

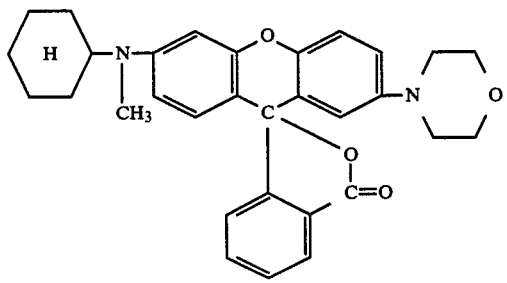

The crude product was extracted with 200 ml. of chlorobenzene, and the extract was treated in the same manner as in Preparation Example 23, whereby 15 g. of said fluoran derivative was obtained as substantially white crystals having a melting point of 259° to 261° C.

EXAMPLE 1

One gram of 3-pyrrolidino-6-methyl-7-anilinofluoran of the formula,

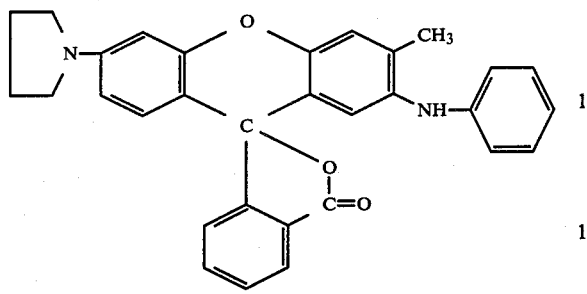

was dissolved at 80° C. in 20 g. of alkylnaphthalene to prepare a liquid A. On the other hand, 20 g. of gelatin (isoelectric point 8.0) and 0.5 g. of C.M.C. were completely dissolved in 120 ml. of water to prepare a liquid B. Subsequently, the liquid A was mixed with the liquid B at 50° to 60° C., and the resulting mixture was emulsified by high speed stirring.

The resulting emulsion was adjusted to a pH of 8.5 to 9.0. After the pH adjustment, the emulsion was stirred at a high speed for 20 minutes and then gradually lowered in pH to 4.2 to 4.4 by addition of dilute hydrochloric or acetic acid. Thereafter, the emulsion was cooled to 5° to 10° C. with continuous stirring and charged with 6 g. of a formalin solution (37%), and the stirring was further continued for additional one hour at 10° to 20° C. Subsequently, the emulsion was adjusted to pH 9.0 by use of an aqueous sodium hydroxide solution (5%). The thus treated emulsion was further stirred gently for several hours to obtain an emulsion containing microcapsules, which had been covered with sufficiently gelled films composed of C.M.C. and gelatin and which contained an alkylnaphthalene solution of 3-pyrrolidino-6-methyl-7-anilinofluoran. This emulsion was coated on a paper and then dried. The coated surface of the said paper was placed on the surface of another paper, on which a phenol-formalin resin had been coated and dried, and letters were written on the uncoated surface of the former paper, whereby blackish green-colored letters were quickly recorded on the resin-coated surface of the latter paper. The thus recorded letters scarcely discolored even when exposed to sunlight over a long period of time.

EXAMPLE 2

A mixture comprising 30 g. of 3-pyrrolidino-7-pyrrolidinofluoran of the formula,

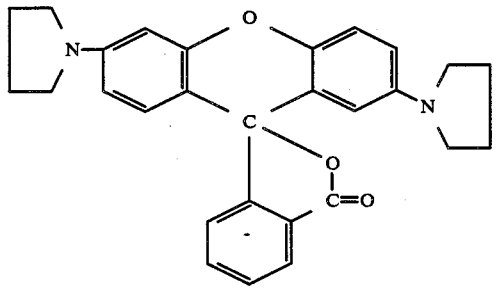

and 15 g. of 3-pyrrolidino-6-chlorofluoran of the formula,

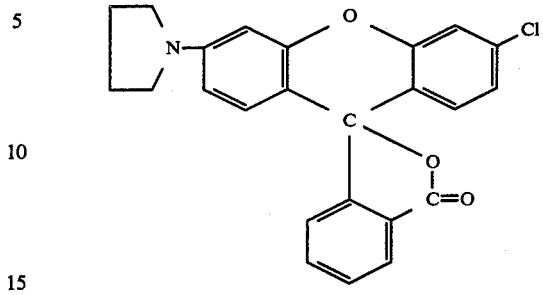

was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of each of the 3-pyrrolidino-7-pyrrolidinofluoran and the 3-pyrrolidino-6-chlorofluoran after pulverization was 1 to 3 microns (component A).

On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subsequently, 3 g. of the component A was mixed with 67 g. of the component B, and the resulting mixture was coated on a paper and then dried to obtain a heat-sensitive recording paper. This recording paper developed a black color quite quickly when heated by means of hot needles, hot types, hot patterns, etc. No spontaneous coloration of the recording paper was observed even after lapse of a long period of time.

EXAMPLE 3

A mixture comprising 30 g. of 3-piperidino-6-methyl-7-chlorofluoran of the formula,

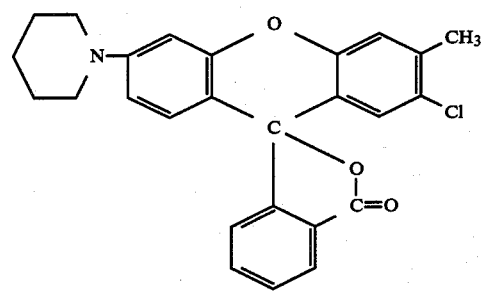

150 g. of a 10% aqueous polyvinyl alcohol solution (the polyvinyl alcohol used was a 98% hydrolyzate) and 65 g. of water was pulverized for one hour to prepare a dispersion. The particle diameter of the chromogenic material after pulverization was 1 to 3 microns (component A).

On the hand, a component B was prepared in the same manner as in Example 2.

Further a mixture comprising 35 g. of talc of 10 microns in size, 150 g. of a 10% aqueous polyvinyl alcohol solution and 65 g. of water was pulverized for one hour (component C).

Subsequently, a mixture comprising 3 g. of the component A, 27 g. of the component B and 40 g. of the component C was coated on a paper and then dried. The coated surface of the paper was superposed with a thin paper manuscript bearing letters or images written thereon with black pencil, black ink, Chinese ink or the like coloring matter liable to absorb infrared rays, and the resulting composite was passed through Risofax BF-11 (an infrared heat-sensitive copying machine manufactured by Riso Kagaku Kogyo Co., Ltd.), whereby the paper quickly developed a red color at portions corresponding to the letters or images of the manuscript.

EXAMPLE 4

One gram of 3-pyrrolidino-6-methyl-7-p-n-butylanilinofluoran of the formula,

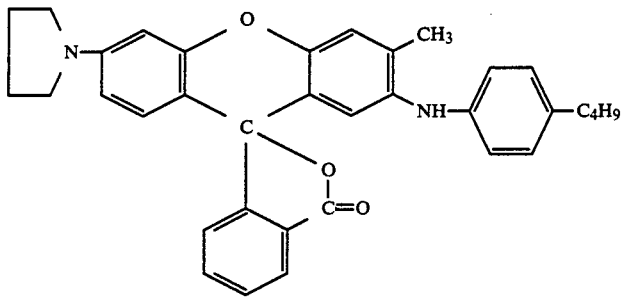

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters of said rubber stamp or wood block were reproduced quickly in a black color on the surface of the paper.

EXAMPLE 5

One gram of 3-(N-methyl-N-cyclohexylamino)-7,8-benzofluoran of the formula,

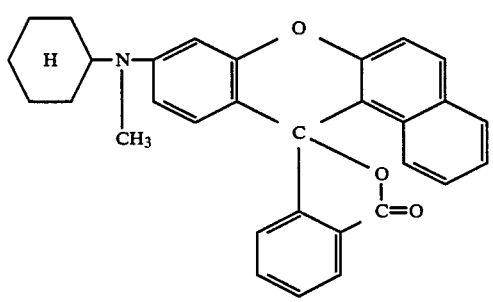

was dissolved at 80° C. in 20 g. of alkylnaphthalene (liquid A). On the other hand, 2.0 g. of gelatin (isoelectric point 8.0) and 0.5 g. of C.M.C. were completely dissolved in 120 ml. of water (liquid B). Subsequently, the liquid A was mixed with the liquid B at 50° to 60° C., and the resulting mixture was emulsified by high speed stirring.

The resulting emulsion was adjusted to a pH of 8.5 to 9.0. After the pH adjustment, the emulsion was stirred at a high speed for 20 minutes, and then gradually lowered in pH to 4.2 to 4.4 by addition of dilute hydrochloric or acetic acid. Thereafter, the emulsion was cooled to 5° to 10° C. with continuous stirring and charged with 6 g. of a formalin solution (37%), and the stirring was further continued for additional one hour at 10° to 20° C. Subsequently, the emulsion was adjusted to pH 9.0 by use of a sodium hydroxide solution (5%). The thus treated emulsion was further stirred gently for several hours to obtain an emulsion containing microcapsules, which had been covered with sufficiently gelled films composed of C.M.C. and gelatin and which contained an alkylnaphthalene solution of 3-(N-methyl-N-cyclohexylamino)-7,8-benzofluoran. This emulsion was coated on a paper and then dried. The coated surface of the said paper was placed on the surface of another paper, on which a clay had been coated and dried, and letters were written on the uncoated surface of the former paper, whereby reddish pink-colored letters were quickly recorded on the clay-coated surface of the latter paper. Even when the surface of the paper coated with the aforesaid capsule-containing emulsion was exposed to sunlight, no coloration took place at all.

EXAMPLE 6

A mixture comprising 35 g. of 3-(N-methyl-N-cyclohexylamino)-7-chlorofluoran of the formula,

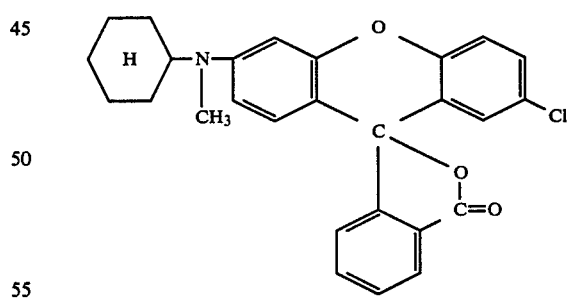

150 g. of a 10% aqueous polyvinyl alcohol solution (the polyvinyl alcohol used was a 98% hydrolyzate) and 65 g. of water was pulverized for one hour to prepare a dispersion. The particle diameter of the 3-(N-methyl-N-cyclohexylamino)-7-chlorofluoran after pulverization was 1 to 3 microns (component A).

On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subsequently, 3 g. of the component A was mixed with 67 g. of the component B, and the resulting mixture was coated on a paper and then dried to obtain a heat-sensitive recording paper. This recording paper developed an orange yellow color quite quickly when heated by means of hot needles, hot types, hot patterns, etc. No spontaneous coloration of the recording paper was observed even after lapse of a long period of time.

EXAMPLE 7

A mixture comprising 12 g. of 3-(N-methyl-N-cyclohexylamino)-7-tert.-butylfluoran of the formula,

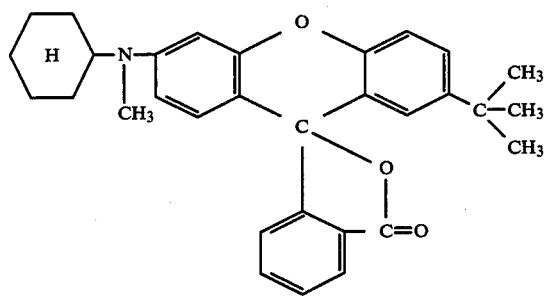

and 30 g. of 3-diethylamino-6-methyl-7-(N-p-n-butyl-phenylamino)-fluoran (a material capable of developing a dark green color by contact with a phenol-formalin resin) was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of the mixture of chromogenic materials was 1 to 3 microns (component A).

On the other hand, a component B was prepared in the same manner as in Example 6.

Further, a mixture comprising 35 g. of talc of 10 microns in size, 150 g. of a 10% aqueous polyvinyl alcohol solution and 65 g. of water was pulverized for one hour (component C).

Subsequently, a mixture comprising 3 g. of the component A, 27 g. of the component B and 40 g. of the component C was coated on a paper and then dried. The coated surface of the paper was superposed with a thin paper manuscript bearing letters or images written thereon with black pencil, black ink, Chinese ink or the like coloring matter liable to absorb infrared rays, and the resulting composite was passed through Risofax BF-11 (an infrared heat-sensitive copying machine manufactured by Riso Kagaku Kogyo Co., Ltd.), whereby the paper quickly developed a black color at portions corresponding to the letters or images of the manuscript.

EXAMPLE 8

1.5 Grams of 3-(N-ethyl-N-cyclohexylamino)-6,7-dimethylfluoran of the formula,

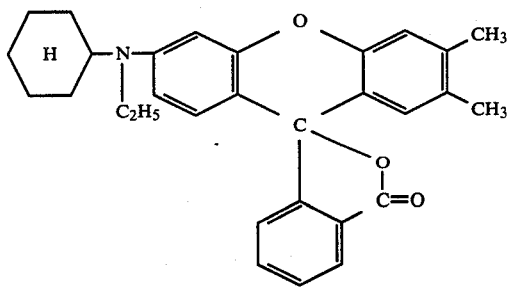

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters of said rubber stamp or wood block were reproduced quickly in an orange red color on the surface of the paper.

EXAMPLE 9

One gram of 3-(N-ethyl-N-cyclohexylamino)-7-dibenzylaminofluoran of the formula,

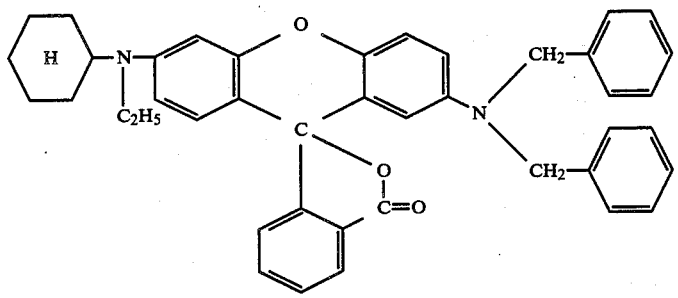

was dissolved at 80° C. in 20 g. of alkylnaphthalene (liquid A). On the other hand, 20 g. of gelatin (isoelectric point 8.0) and 0.5 g. of C.M.C. were completely dissolved in 120 ml. of water (liquid B). Subsequently, the liquid A was mixed with the liquid B at 50° to 60° C., and the resulting mixture was emulsified by high speed stirring.

The resulting emulsion was adjusted to a pH of 8.5 to 9.0. After the pH adjustment, the emulsion was stirred at a high speed for 20 minutes and then gradually lowered in pH to 4.2 to 4.4 by addition of dilute hydrochloric or acetic acid. Thereafter, the emulsion was cooled to 5° to 10° C. with continuous stirring and charged with 6 g. of a formalin solution (37%), and the stirring was further continued for additional one hour at 10° to 20° C. Subsequently, the emulsion was adjusted to pH 9.0 by use of a sodium hydroxide solution (5%). The thus treated emulsion was further stirred gently for several hours to obtain an emulsion containing microcapsules which had been covered with sufficiently gelled films composed of C.M.C. and gelatin and which contained an alkylnaphthalene solution of 3-(N-ethyl-N-cyclohexylamino)-7-dibenzylaminofluoran. This emulsion was coated on a paper and then dried. The coated surface of the said paper was placed on the surface of another paper, on which a phenol-formalin resin had been coated and dried, and letters were written on the uncoated surface of the former paper, whereby green colored letters were quickly recorded on the resin-coated surface of the latter paper. The thus recorded letters scarcely discolored even when exposed to sunlight over a long period of time.

EXAMPLE 10

A mixture comprising 30 g. of 3-(N-cyclohexyl-N-benzylamino)-6-methyl-7-anilinofluoran of the formula,

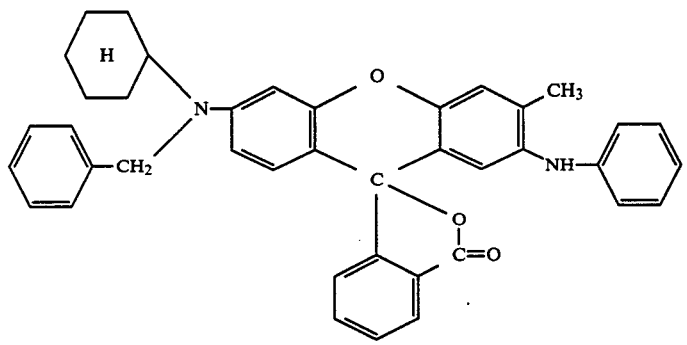

and 4.5 g. of 3-(N-methyl-N-cyclohexylamino)-6-methyl-7-dibenzylaminofluoran of the formula,

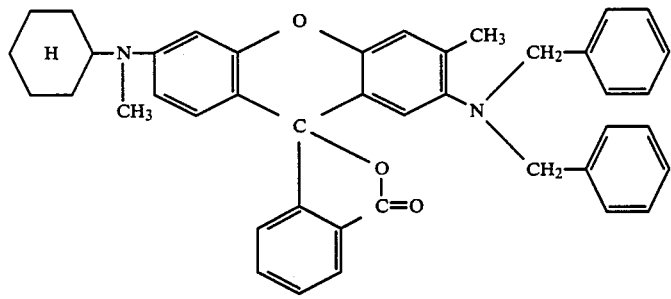

was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of each of the 3-(N-cyclohexyl-N-benzylamino)-6-methyl-7-anilinofluoran and the 3-(N-methyl-N-cyclohexylamino)-6-methyl-7-benzylaminofluoran was 1 to 3 microns (component A).

On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subseqnently, 3 g. of the component A was mixed with 67 g. of the component B, and the resulting mixture was coated on a paper and then dried to obtain a heat-sensitive recording paper. This recording paper developed a black color quite quickly when heated by means of hot needles, hot types, hot patterns, etc. No spontaneous coloration of the recording paper was observed even after lapse of a long period of time.

EXAMPLE 11

One gram of 3-(N-methyl-N-cyclohexylamino)-7-cyclohexylaminofluoran of the formula,

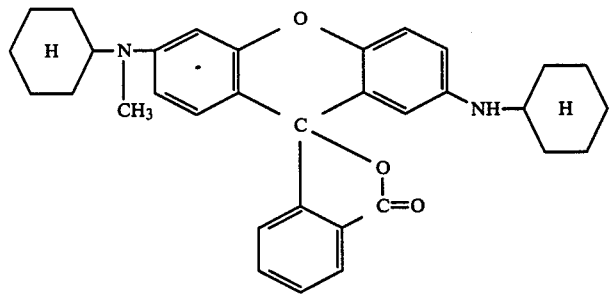

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters of said rubber stamp or wood block were reproduced quickly in a blackish green color on the surface of the paper.

EXAMPLE 12

One gram of 3-(N-methyl-N-cyclohexylamino)-6-methyl-7-anilinofluoran of the formula,

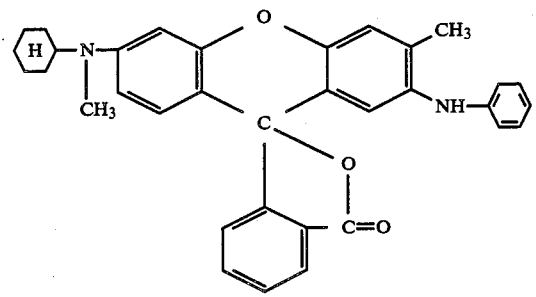

was dissolved at 80° C. in 20 g. of alkylnaphthalene (liquid A). On the other hand, 2.0 g. of gelatin (isoelectric point 8.0) and 0.5 g. of C.M.C. were completely dissolved in 120 ml. of water (liquid B). Subsequently, the liquid A was mixed with the liquid B at 50° to 60° C., and the resulting mixture was emulsified by high speed stirring.

The resulting emulsion was adjusted to a pH of 8.5 to 9.0. After the pH adjustment, the emulsion was stirred at a high speed for 20 minutes, and then gradually lowered in pH to 4.2 to 4.4 by addition of dilute hydrochloric or acetic acid. Thereafter, the emulsion was cooled to 5° to 10° C. with continuous stirring and charged with 6 g. of a formalin solution (37%), and the stirring was further continued for additional one hour at 10° to 20° C. Subsequently, the emulsion was adjusted to pH 9.0 by use of a sodium hydroxide solution (5%). The thus treated emulsion was further stirred gently for several hours to obtain an emulsion containing microcapsules, which had been covered with sufficiently gelled films composed of C.M.C. and gelatin and which contained an alkylenenaphthalene solution of 3-(N-methyl-N-cyclohexylamino)-6-methyl-7-anilinofluoran. This emulsion was coated on a paper and then dried. The coated surface of the said paper was placed on the surface of another paper, on which a phenolformalin resin had been coated and dried, and letters were sritten on the uncoated surface of the former paper, whereby black-colored letters were quickly recorded on the resin-coated surface of the latter paper. The thus recorded letters scarcely discolored even when exposed to sunlight over a long period of time.

EXAMPLE 13

A mixture comprising 35 g. of 3-(N-methyl-N-cyclohexylamino)-6-methyl-7-p-n-butyl-anilinofluoran of the formula,

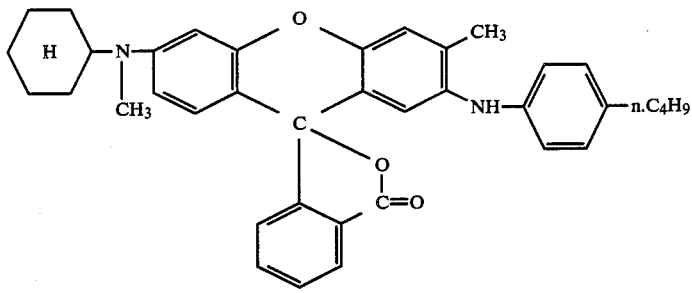

and 3.5 g. of 3-(N-methyl-N-phenylamino)-7,8-benzofluoran (a material capable of developing a red color) of the formula,

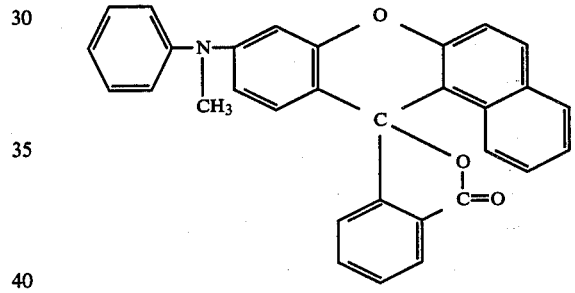

was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of each of the 3-(N-methyl-N-cyclohexylamino)-6-methyl-7-p-n-butylanilinofluoran and the 3-(N-methyl-N-phenylamino)-7,8-benzofluoran after pulverization was 1 to 3 microns (component A).

On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subsequently, 3 g. of the component A was mixed with 67 g. of the component B, and the resulting mixture was coated on a paper and then dried to obtain a heat-sensitive recording paper. This recording paper developed a black color quite quickly when heated by means of hot needles, hot types, hot patterns, etc. No spontaneous coloration of the recording paper was observed even after lapse of a long period of time.

EXAMPLE 14

30 Grams of 3-(N-ethyl-N-cyclohexylamino)-6-methyl-7-o,p-dimethylanilinofluoran of the formula,

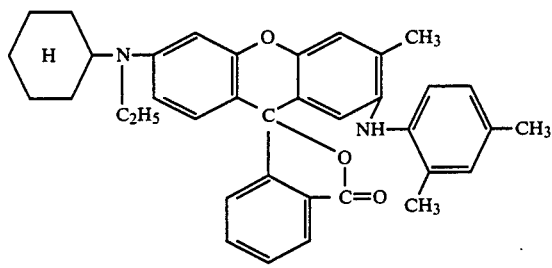

was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of the chromogenic material after pulverization was 1 to 3 microns (component A).

On the other hand, a component B was prepared in the same manner as in Example 13.

Further, a mixture comprising 35 g. of talc of 10 microns in size, 150 g. of a 10% aqueous polyvinyl alcohol solution and 65 g. of water pulverized for one hour (component C).

Subsequently, a mixture comprising 3 g. of the component A, 27 g. of the component B and 40 g. of the component C was coated on a paper and then dried. The coated surface of the paper was superposed with a thin paper manuscript bearing letters or images written thereon with black pencil, black ink, Chinese ink or the like coloring matter liable to absorb infrared rays, and the resulting composite was passed through Risofax BF-11 (an infrared heat-sensitive copying machine manufactured by Riso Kagaku Kogyo Co., Ltd.), whereby the paper quickly developed a blackish green color at portions corresponding to the letters or images of the manuscript.

EXAMPLE 15

0.8 Gram of 3-(N-ethyl-N-cyclohexylamino)-6-methyl-7-p-ethoxyphenylaminofluoran of the formula,

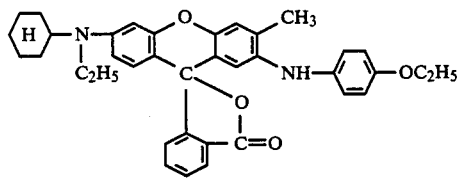

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters of said rubber stamp or wood block were reproduced quickly in a black color on the clay-coated surface of the paper.

EXAMPLE 16

One gram of 3-methylpiperidino-6-methyl-7-p-methylanilinofluoran of the formula,

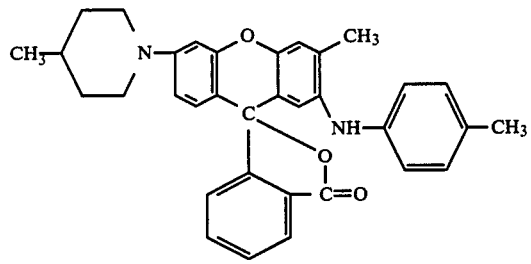

was dissolved at 80° C. in 20 g. of alkylnaphthalene (liquid A). On the other hand, 3.0 g. of gelatin (isoelectric point 8.0) and 0.5 g. of C.M.C. were completely dissolved in 120 ml. of water (liquid B). Subsequently, the liquid A was mixed with the liquid B at 50° to 60° C., and the resulting mixture was emulsified by high speed stirring.

The resulting emulsion was adjusted to a pH of 8.5 to 9.0. After the pH adjustment, the emulsion was stirred at a high speed for 20 minutes and then gradually lowered in pH to 4.2 to 4.4 by addition of dilute hydrochloric or acetic acid. Thereafter, the emulsion was cooled to 5° to 10° C. with continuous stirring and then charged with 6 g. of a formalin solution (37%), and the stirring was further continued for additional one hour at 10° to 20° C. Subsequently, the emulsion was adjusted to pH 9.0 by use of a sodium hydroxide solution (5%). The thus treated emulsion was further stirred gently for several hours to obtain an emulsion containing microcapsules (containing therein an alkylnaphthalene solution of 3-methylpiperidino-6-methyl-7-p-methylanilinofluoran), which had been covered with sufficiently gelled films composed of C.M.C. and gelatin. This emulsion was coated on a paper and then dried. The coated surface of the said paper was placed on the surface of another paper, on which a clay had been coated and dried, and letters were written on the uncoated surface of the former paper, whereby black-colored letters were quickly recorded on the clay-coated surface of the latter paper. The thus recorded letters scarcely discolored even when exposed to sunlight.

EXAMPLE 17

A mixture comprising 1 g. of 3-p-methylpiperidino-6-methyl-7-p-ethoxyanilinofluoran of the formula,

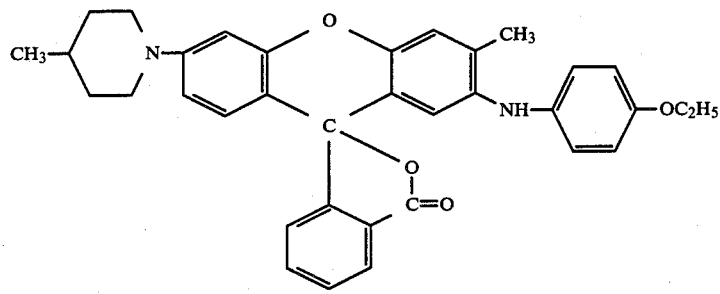

and 0.2 g. of 3-p-methylpiperidino-6-methyl-8-methyl-fluoran of the formula,

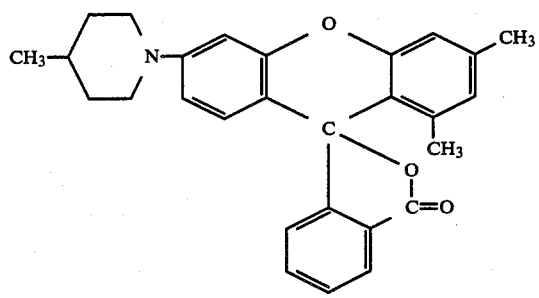

was dissolved at 80° C. in 20 g. of alkyldiphenylmethane (liquid A). On the other hand, 4.0 g. of gelatin (isoelectric point 8.0) and 0.5 g. of C.M.C. were completely dissolved in 120 ml. of water (liquid B). Subsequently, the liquid A and the liquid b were treated in the same manner as in Example 16 to prepare an emulsion containing microcapsules. This emulsion was coated on a paper and then dried. The coated surface of the said paper was placed on the surface of another paper, on which a phenol-formalin resin had been coated and dried, and letters were written on the uncoated surface of the former paper, whereby black-colored letters were quickly recorded on the resin-coated surface of the latter paper. The thus recorded letters scarcely discolored even when exposed to sunlight.

EXAMPLE 18

3 Grams of 3-p-methylpiperidino-6-methyl-7-anilino-fluoran of the formula,

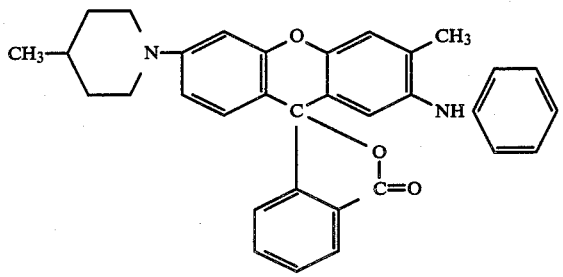

was mixed with 150 g. of a 10% aqueous polyvinyl alcohol solution (the polyvinyl alcohol used was a 98% hydrolyzate) and 68 g. of water, and the resulting mixture was pulverized for one hour to prepare a dispersion. The particle diameter of the 3-p-methylpiperidino-6-methyl-7-anilinofluran after pulverization was 1 to 3 microns (component A). On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subsequently, 3 g. of the component A was mixed with 67 g. of the component B, and the resulting mixture was coated on a paper and then dried to obtain a heat-sensitive recording paper. This recording paper developed a black color when heated by means of hot needles, hot types, hot patterns, etc. No spontaneous coloration of the recording paper was observed even after lapse of a long period of time.

EXAMPLE 19

30 Grams of 3-p-methylpiperidino-7-cyclohexylaminofluoran of the formula,

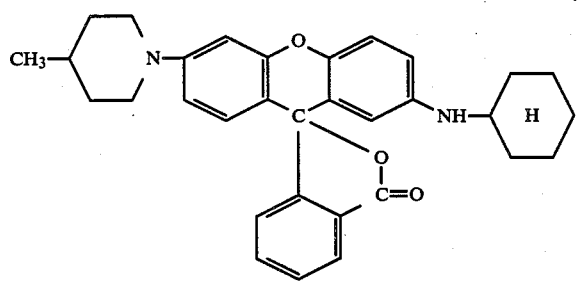

was mixed with 150 g. of a 10% aqueous polyvinyl alcohol solution (the polyvinyl alcohol used was a 98% hydrolyzate) and 65 g. of water, and the resulting mixture was pulverized for one hour to prepare a dispersion. The particle diameter of the chromogenic material after pulverization was 1 to 3 microns (component A). On the other hand, a component B was prepared in the same manner as in Example 18. Further, a mixture comprising 35 g. of talc of 10 microns in size, 150 g. of a 10% aqueous polyvinyl alcohol solution and 65 g. of water was pulverized for one hour (component C).

Subsequently, a mixture comprising 3 g. of the component A, 27 g. of the component B and 40 g. of the component C was coated on a paper and then dried. The coated surface of the paper was superposed with a thin paper manuscript bearing letters or images written thereon with black pencil, black ink, Chinese ink or the like coloring matter liable to absorb infrared rays, and the resulting composite was passed through Risofax BF-11 (an infrared heat-sensitive copying machine manufactured by Riso Kagaku Kogyo Co., Ltd.), whereby the paper quickly developed a green color at portions corresponding to the letters or images of the manuscript.

EXAMPLE 20

One gram of 3-p-methylpiperidino-5,6-benzofluoran of the formula,

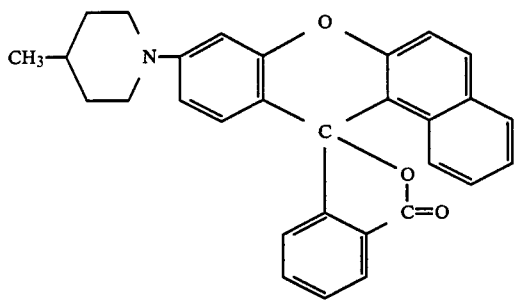

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters or images of said rubber stamp or wood block were reproduced quickly in a deep pink color on the clay-coated surface of the paper.

EXAMPLE 21

One gram of 3-(N-methyl-N-cyclohexylamino)-7-morpholinofluoran of the formula,

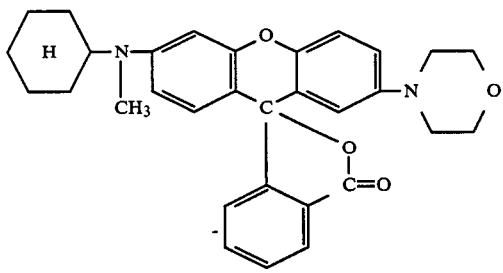

was dissolved at 80° C. in 20 g. of alkylnaphthalene (liquid A). On the other hand, 2.0 g. of gelatin (isoelectric point 8.0) and 0.5 g. of C.M.C. were completely dissolved in 120 ml. of water (liquid B). Subsequently, the liquid A was mixed with the liquid B at 50° to 60° C., and the resulting mixture was emulsified by high speed stirring. The resulting emulsion was adjusted to a pH of 8.5 to 9.0. After the pH adjustment, the emulsion was stirred at a high speed for 20 minutes and then gradually lowered in pH to 4.2 to 4.4 by addition of dilute hydrochloric or acetic acid. Thereafter, the emulsion was cooled to 5° to 10° C. with continuous stirring and then charged with 6 g. of a formalin solution (37%), and the stirring was further continued for additional one hour at 10° to 20° C. Subsequently, the emulsion was adjusted to pH 9.0 by use of a sodium hydroxide solution (5%). The thus treated emulsion was further stirred gently for several hours to obtain an emulsion containing microcapsules (containing therein an alkylnaphthalene solution of 3-(N-methyl-N-cyclohexylamino)-7-morpholinofluoran), which had been covered with sufficiently gelled films composed of C.M.C. and gelatin.

This emulsion was coated on a paper and then dried. The coated surface of said paper was placed on the surface of another paper, on which a clay had been coated and dried, and letters were written on the uncoated surface of the former paper, whereby reddish brown colored letters were quickly recorded on the clay-coated surface of the latter paper. Even when the surface of the paper coated with the aforesaid capsule-containing emulsion was exposed to sunlight, no coloration of the paper surface took place at all.

EXAMPLE 22

35 Grams of 3-(N-methyl-N-cyclohexylamino)-7-p-methylpiperidinofluoran of the formula,

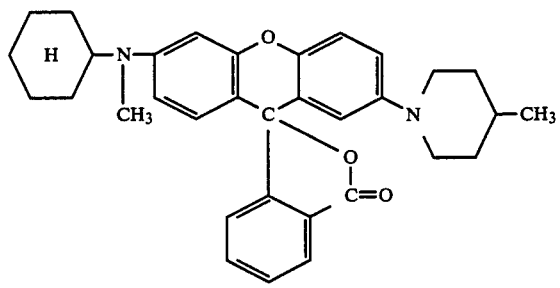

was mixed with 150 g. of a 10% aqueous polyvinyl alcohol solution (the polyvinyl alcohol used as a 98% hydrolyzate) and 65 g. of water, and the resulting mixture was pulverized for several hours to prepare a dispersion. The particle diameter of the 3-(N-methyl-N-cyclohexylamino)-7-p-methylpiperidinofluoran after pulverization was 1 to 3 microns (component A). On the other hand, a mixture comprising 35 g. of 4,4'-isopropylidene-diphenol (bisphenol A), 150 g. of a 10% aqueous polyvinyl alcohol solution and 65 g. of water was pulverized for one hour. The particle diameter of the bisphenol A after pulverization was 1 to 3 microns (component B).

Subsequently, 3 g. of the component A was mixed with 67 g. of the component B, and the resulting mixture was coated on a paper and then dried to obtain a heat-sensitive recording paper. This recording paper developed a black color quite quickly when heated by means of hot needles, hot types, hot patterns, etc. No spontaneous coloration of the recording paper was observed even after lapse of a long period of time.

EXAMPLE 23

1.5 Grams of 3-(N-methyl-N-cyclohexylamino)-7-piperidinofluoran of the formula,

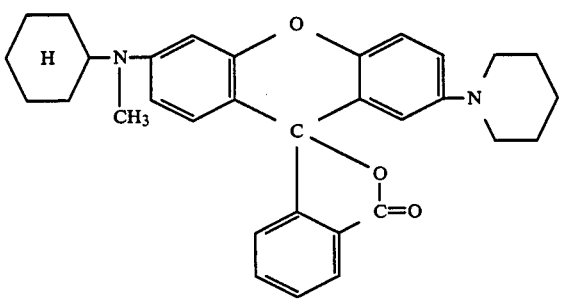

was dissolved in a mixture comprising 5 g. of dibutyl phthalate, 10 g. of castor oil and 5 g. of chlorinated paraffin to prepare a solution. A rubber stamp or wood block for printing was immersed in said solution and then brought into contact with the surface of a paper, on which an active clay had been coated and dried, whereby the letters of said rubber stamp or wood block were reproduced quickly in a brown color on the surface of the paper.

What we claim is:

1. A fluoran compound of the formula

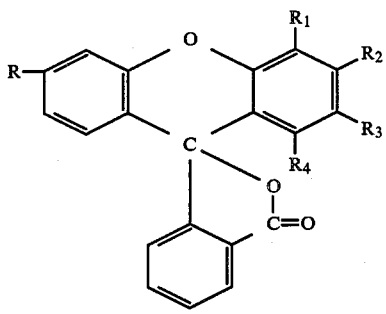

wherein
R is piperidino or methylpiperidino;
$R_1$ is a hydrogen, $C_1$ to $C_4$-alkyl or halogen;
$R_2$ is a hydrogen, $C_1$ to $C_4$-alkyl, $C_1$ to $C_4$-alkoxy or halogen;
$R_3$ is hydrogen, $C_1$ to $C_8$-alkyl, $C_1$ to $C_4$-alkoxy, halogen, piperidino, diphenylmethylamino which phenyl portion may be substituted with a halogen atom or a group of the formula

wherein X is a hydrogen, cyclohexyl, benzyl, benzoyl phenyl which may be substituted with $C_1$ to $C_4$-alkyl or $C_1$ to $C_4$-alkoxy;
Y is a hydrogen, $C_1$ to $C_4$-alkyl or benzyl;
$R_4$ is hydrogen, $C_1$ to $C_4$-alkyl or $C_1$ to $C_4$-alkoxy;
$R_1$ and $R_2$, or $R_3$ and $R_4$ may be groups represented by the formula —CH=CH—CH=CH—, and in this case, the naphthalene ring may have halogen or an amino group which may be substituted with benzyl or acetyl.

2. A fluoran compound of claim 1 wherein R is piperidino; $R_1$ is hydrogen; $R_2$ is hydrogen or $C_1$ to $C_4$-alkyl; $R_3$ is hydrogen halogen, piperidino or a group of the formula

wherein X is phenyl and Y is hydrogen or $C_1$ to $C_4$-alkyl; $R_4$ is hydrogen; $R_1$ and $R_2$ may be a group represented by the formula

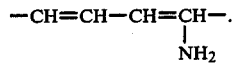

3. A fluoran compound of claim 1 wherein R is piperidino; $R_1$ is hydrogen, $R_2$ is hydrogen or methyl; $R_3$ is hydrogen, halogen, piperidino or a group of the formula

wherein X is phenyl and Y is hydrogen or methyl; $R_4$ is hydrogen; and $R_1$ and $R_2$ may be a group represented by the formula

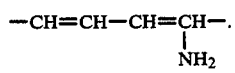

4. A fluoran compound of claim 1 wherein R is methylpiperidino; $R_1$ is hydrogen, $C_1$ to $C_4$-alkyl or halogen; $R_2$ is hydrogen, $C_1$ to $C_4$-alkyl, $C_1$ to $C_4$-alkoxy or halogen; $R_3$ is hydrogen, $C_1$ to $C_8$-alkyl, $C_1$ to $C_4$-alkoxy, halogen, diphenylmethylamino which may be substituted with halogen, or a group of the formula

wherein X is hydrogen, cyclohexyl, benzyl, benzoyl, or phenyl which may be substituted with $C_1$ to $C_4$-alkyl, or $C_1$ to $C_4$-alkoxy; Y is hydrogen, $C_1$ to $C_4$-alkyl, or benzyl; $R_4$ is hydrogen, $C_1$ to $C_4$-alkyl, or $C_1$ to $C_4$-alkoxy; $R_4$ is hydrogen, $C_1$ to $C_4$-alkyl, or $C_1$ to $C_4$-alkoxy; $R_1$ and $R_2$ or $R_3$ and $R_4$ may be groups represented by the formula —CH=CH—CH=CH—, and in this case, the naphthalene ring may have halogen or an amino group which may be substituted with benzyl or acetyl.

5. A fluoran compound of claim 1 wherein R is methylpiperidino; $R_1$ is hydrogen, $C_1$ to $C_4$-alkyl; $R_2$ is hydrogen, $C_1$ to $C_4$-alkyl; $R_3$ is

X is hydrogen, cyclohexyl, benzyl, benzoyl, or phenyl which may be substituted with $C_1$ to $C_4$-alkyl or $C_1$ to $C_4$-alkoxy; Y is hydrogen, $C_1$ to $C_4$-alkyl or benzyl; $R_4$ is hydrogen.

6. A fluoran compound of claim 1 wherein R is methylpiperidino; $R_1$ is hydrogen, methyl; $R_2$ is hydrogen, methyl; $R_3$ is

X is hydrogen, cyclohexyl, benzyl, benzoyl or phenyl which may be substituted with methyl, butyl or ethoxy, Y is hydrogen, methyl, or benzyl; R₄ is hydrogen.

7. A fluoran compound of claim 1 wherein R is methylpiperidino; $R_1$ is hydrogen, $R_2$ is hydrogen; $R_3$ and $R_4$ are a group represented by the formula —CH=CH—CH=CH—.

8. 3-Piperidino-6-methyl-7-chlorofluoran.
9. 3-Piperidino-7-piperidinofluoran.
10. 3-Methylpiperidino-6-methyl-7-phenylaminofluoran.
11. 3-Methylpiperidino-6-methyl-7-chlorofluoran.
12. 3-Methylpiperidino-7-cyclohexylaminofluoran.
13. 3-Methylpiperidino-7-di(p-chlorophenyl)methylaminofluoran.
14. 3-Piperidino-6-methyl-7-phenylaminofluoran.
15. A fluoran compound of the formula

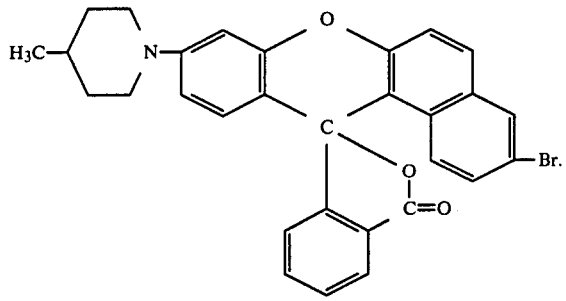

* * * * *